(12) United States Patent
Kiemele et al.

(10) Patent No.: US 11,481,571 B2
(45) Date of Patent: Oct. 25, 2022

(54) AUTOMATED LOCALIZED MACHINE LEARNING TRAINING

(71) Applicant: MICROSOFT TECHNOLOGY LICENSING, LLC, Redmond, WA (US)

(72) Inventors: Kenneth Liam Kiemele, Redmond, WA (US); John Benjamin Hesketh, Kirkland, WA (US); Evan Lewis Jones, Kirkland, WA (US); James Lewis Nance, Kirkland, WA (US); LaSean Tee Smith, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1302 days.

(21) Appl. No.: 15/870,795

(22) Filed: Jan. 12, 2018

(65) Prior Publication Data

US 2019/0220697 A1    Jul. 18, 2019

(51) Int. Cl.
*G06K 9/62* (2022.01)
*G06N 20/20* (2019.01)
(Continued)

(52) U.S. Cl.
CPC ......... *G06K 9/6227* (2013.01); *G06K 9/6262* (2013.01); *G06K 9/6288* (2013.01);
(Continued)

(58) Field of Classification Search
CPC .. G06K 9/6227; G06K 9/6262; G06K 9/6288; G06N 20/00; G06N 20/20;
(Continued)

(56) References Cited

U.S. PATENT DOCUMENTS 7,151,801 B2  12/2006  Grossberg et al.
9,087,402 B2   7/2015  Doolittle
(Continued)

FOREIGN PATENT DOCUMENTS

EP    3232371 A1    10/2017

OTHER PUBLICATIONS

Brukner, et al., "Hierarchical Semantic Processing Architecture for Smart Sensors in Surveillance Networks". In the Proceedings of IEEE Transactions on Industrial Informatics, vol. 8, No. 2, May 1, 2012, 11 Pages.
(Continued)

*Primary Examiner* — Vu A Vu
(74) *Attorney, Agent, or Firm* — NovoTechIP International PLLC

(57) ABSTRACT

Techniques for generating a machine learning model to detect event instances from physical sensor data, including applying a first machine learning model to first sensor data from a first physical sensor at a location to detect an event instance, determining that a performance metric for use of the first machine learning model is not within an expected parameter, obtaining second sensor data from a second physical sensor during a period of time at the same location as the first physical sensor, obtaining third sensor data from the first physical sensor during the period of time, generating location-specific training data by selecting portions of the third sensor data based on training event instances detected using the second sensor data, training a second ML model using the location-specific training data, and applying the second ML model instead of the first ML model for detecting event instances.

20 Claims, 13 Drawing Sheets

(51) Int. Cl.

| | |
|---|---|
| *G06V 10/25* | (2022.01) |
| *G06V 20/52* | (2022.01) |
| *G06V 40/10* | (2022.01) |
| *G06V 40/20* | (2022.01) |
| *G06T 7/73* | (2017.01) |
| *G06N 20/00* | (2019.01) |
| *H04W 4/70* | (2018.01) |

(52) U.S. Cl.
CPC ............ *G06N 20/00* (2019.01); *G06N 20/20* (2019.01); *G06T 7/75* (2017.01); *G06V 10/25* (2022.01); *G06V 20/52* (2022.01); *G06V 40/10* (2022.01); *G06V 40/20* (2022.01); *H04W 4/70* (2018.02)

(58) Field of Classification Search
CPC .......... G06T 7/75; G06V 10/25; G06V 20/52; G06V 40/10; G06V 40/20; H04W 4/70
USPC .......................................................... 706/12
See application file for complete search history.

(56) References Cited

U.S. PATENT DOCUMENTS

| | | | |
|---|---|---|---|
| 9,626,766 | B2 | 4/2017 | Criminisi et al. |
| 10,535,138 | B2 * | 1/2020 | Pfeiffer ................ G05D 1/0253 |
| 2007/0103595 | A1 | 5/2007 | Gong et al. |
| 2013/0159223 | A1 | 6/2013 | Bahl et al. |
| 2013/0346346 | A1 | 12/2013 | Criminisi et al. |
| 2014/0122381 | A1 | 5/2014 | Nowozin |
| 2014/0172753 | A1 | 6/2014 | Nowozin |
| 2015/0058004 | A1 | 2/2015 | Dimitriadis et al. |
| 2015/0160785 | A1 | 6/2015 | Wang et al. |
| 2015/0248764 | A1 | 9/2015 | Keskin et al. |
| 2015/0248765 | A1 | 9/2015 | Criminisi et al. |
| 2015/0269050 | A1 | 9/2015 | Filimonov et al. |
| 2017/0132496 | A1 | 5/2017 | Shoaib et al. |
| 2017/0185871 | A1 | 6/2017 | Zhang et al. |
| 2017/0206431 | A1 | 7/2017 | Sun et al. |
| 2017/0236286 | A1 | 8/2017 | Fanello et al. |
| 2017/0262768 | A1 | 9/2017 | Nowozin et al. |
| 2018/0306609 | A1 | 10/2018 | Agarwal et al. |
| 2019/0220698 | A1 | 7/2019 | Pradeep |

OTHER PUBLICATIONS

Kim, et al., "Generation of ROI Enhanced Depth Maps Using Stereoscopic Cameras and a Depth Camera", In the Proceedings of IEEE Transactions on Broadcasting, vol. 54, No. 4, Dec. 1, 2008, 9 Pages.

Mesmakhosroshaki, et al., "Stereo based region of interest generation for pedestrian detection in driver assistance systems", In the Proceedings of IEEE International Conference on Image Processing, Sep. 1, 2013, 4 Pages.

"International Search Report & Written Opinion Issued in PCT Patent Application No. PCT/US18/066626", dated Mar. 13, 2019, 14 Pages.

"International Search Report & Written Opinion Issued in PCT Patent Application No. PCT/US18/066627", dated Mar. 22, 2019, 16 Pages.

Waehner, Kai, "Howto Build and Deploy Scalable Machine Learning in Production with Apache Kafka", Retrieved From: https://www.confluent.io/blog/build-deploy-scalable-machine-learning-production-apache-kafka/, Sep. 29, 2017, 8 Pages.

Patterson, Steven Max, "Google focuses on a future of even better mobile cameras", Retrieved From <<https://www.networkworld.com/article/3193383/mobile-wireless/google-focuses-on-a-future-of-even-better-mobile-cameras.hml>>, May 1, 2017, 6 Pages.

Romano, et al., "RAISR: Rapid and Accurate Image Super Resolution", In Journal of IEEE Transactions on Computational Imaging, vol. 3, Issue 1, Mar. 2017, pp. 1-31.

Rushdi, et al., "Augmented Coupled Dictionary Learning for Image Super-Resolution", In Journal of 11th International Conference on Machine Learning and Applications, Dec. 12, 2012, pp. 262-267.

Wilson, Andy, "Machine learning leverages image classification techniques", Retrieved From <<http://www.vision-systems.com/articles/print/volume-20/issue-2/features/machine-learning-leverages-image-classification-techniques.hml>>, Feb. 4, 2015, 5 Pages.

"Notice of Allowance Issued in U.S. Appl. No. 15/870,783", dated Apr. 13, 2022, 9 Pages.

"Office Action Issued in Indian Patent Application No. 202047025181", dated Jun. 27, 2022, 7 Pages.

* cited by examiner

AUTOMATED LOCALIZED MACHINE LEARNING TRAINING

BACKGROUND

Machine learning (ML) technologies have offered significant improvements in recognizing the occurrence of events from a wide variety of sources. Through the implementation of ML the capacity of computing devices to identify events has increased substantially. Although more commonly associated with cloud-based implementations, these technologies have found their way into self-contained sensing devices, such as low-power Internet of Things (IoT) devices. In some cases, the devices can include sensors configured to capture data for various types of modalities. The devices may also include ML models intended to assist in the event recognition process.

However, such devices can be placed in environments, or experience changes in their environment, where an ML model effectiveness is reduced. Furthermore, it can be difficult both to identify the occurrence of such situations (particularly in situations where resulting from intermittent changes in the environment) and to obtain a new ML model that is more effective. The development of an improved ML model training process is necessary to establish more reliable ML models in these and other types of situations.

SUMMARY

A system for generating an ML model to detect event instances from physical sensor data is disclosed. The system includes a first physical sensor at a first location; a second physical sensor, wherein the second physical sensor is different than the first physical sensor; an ML event detection component at the first location and configured to apply a first ML model to detect event instances based on sensor data obtained from the first physical sensor; and a machine readable medium including instructions which, when executed by the system, cause the system to receive, at the ML event detection component, first sensor data obtained from the first physical sensor, apply the first ML model, at the ML event detection component, to detect a first event based on at least the first sensor data and generate corresponding first event instance data, calculate a first performance metric for use of the first ML model in the first location, based on at least the application of the first ML model, automatically determine whether the first performance metric is within an expected parameter, and in response to a determination that the first performance metric is not within the expected parameter: obtain second sensor data from the second physical sensor at the first location during a first period of time, obtain third sensor data from the first physical sensor during the first period of time, generate first location-specific training data by selecting portions of the third sensor data based on first training event instances detected using the second sensor data, train a second ML model based on at least the first location-specific training data, and reconfigure the ML event detection component to apply the second ML model instead of the first ML model.

In another implementation, a method for generating an ML model to detect event instances from physical sensor data is disclosed. The method includes operating, at a first location, a first device including a first physical sensor and an ML event detection component, where the ML event detection component is configured to apply a first ML model to detect event instances based on sensor data obtained from the first physical sensor. The method further includes receiving, at the ML event detection component, first sensor data obtained from the first physical sensor, and applying the first ML model, at the ML event detection component, to detect a first event based on at least the first sensor data and generate corresponding first event instance data. In addition, the method involves calculating a first performance metric for use of the first ML model in the first location, based on at least the application of the first ML model, and automatically determining that the first performance metric is not within an expected parameter. In response to the determination that the first performance metric is not within the expected parameter, the method further involves obtaining second sensor data obtained from a second physical sensor at the first location during a first period of time, where the second physical sensor is different than the first physical sensor, obtaining third sensor data from the first physical sensor during the first period of time, and generating first location-specific training data by selecting portions of the third sensor data based on first training event instances detected using the second sensor data. In addition, the method includes training a second ML model based on at least the first location-specific training data, and reconfiguring the ML component to apply the second ML model instead of the first ML model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
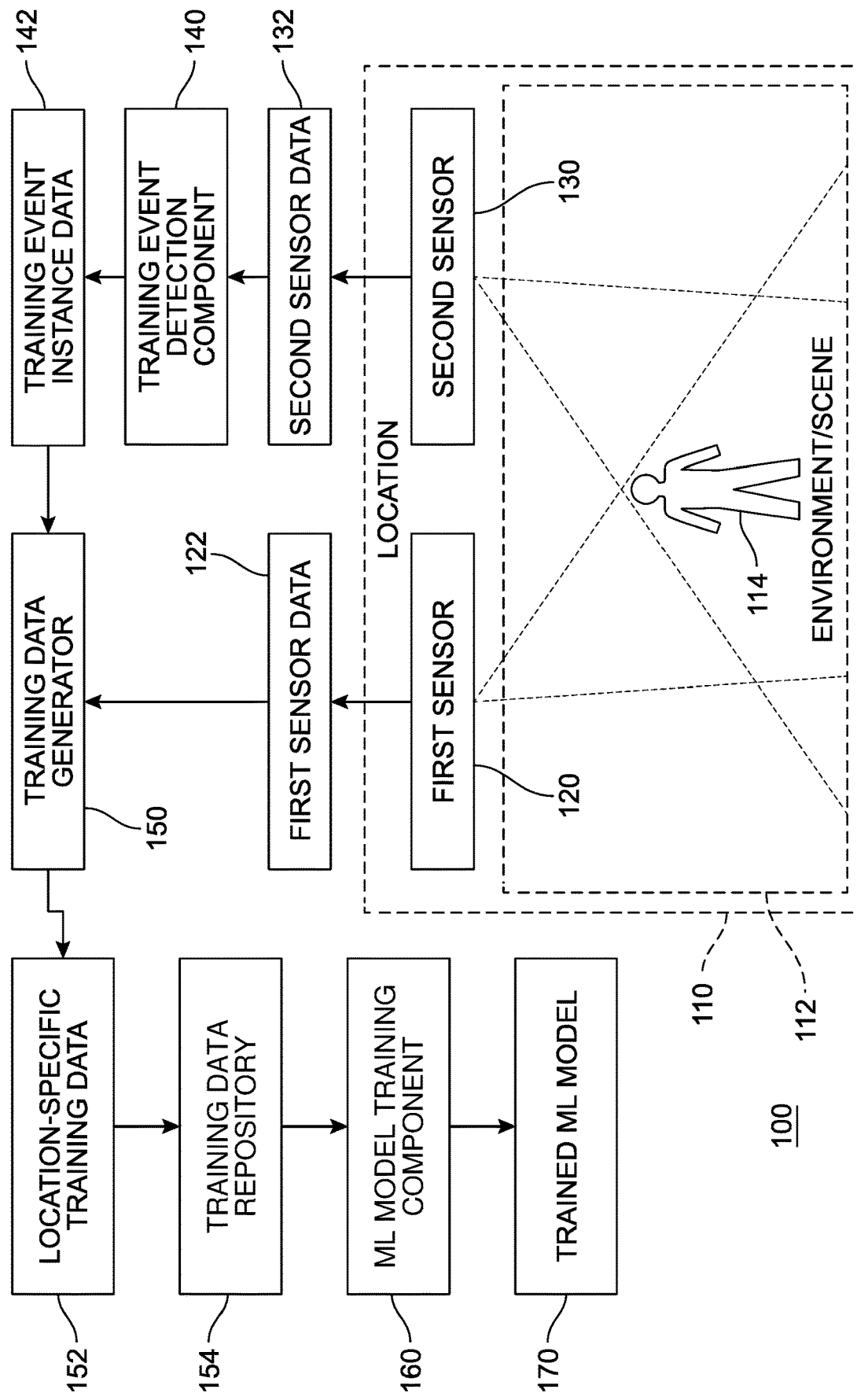
FIG. 1 illustrates an example system for generating a machine learning (ML) model for detecting events from a first physical sensor with the assistance of a second physical sensor.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

As noted above, the use of low-cost physical sensors in the identification of events of interest (and individual instances of those events) is associated with many challenges. Physical sensor data (or "sensor data") can be obtained through the use of any type of physical sensor (which, in some examples, may include control logic for control and/or communication) that measures the occurrence and/or degree of physical phenomena and provides information relating to such measurements. Generally, low-cost physical sensors have been understood to provide less reliable or lower quality data in comparison to high-cost sensors. For purposes of this description, a "low-cost sensor" or "economical sensor" refers to a physical sensor that can be employed with substantially lower energy consumption or power, emitting substantially less heat, is substantially smaller in one or more dimensions and/or volume, requires substantially less maintenance, does not require specific operating conditions, produces sensor data requiring substantially less processing, and/or has a substantially lower monetary cost for manufacture and/or operation in comparison to another high-cost physical sensor. The high-cost sensor can be of a different sensor type or the same sensor type as the low-cost sensor. The high-cost sensor can provide a different sensor data type or the same sensor data type as the low-cost sensor. In some implementations, a single sensor may be selectively operated as either a low-cost or high-cost sensor; for example, a sensor may be selectively operated in a low fidelity or high quality mode or a more energy or processor intensive high fidelity or high quality mode.

For purposes of this disclosure, a "sensor type" refers to a particular modality that a physical sensor is designed to operate in and/or receive or detect information about. For example, some broad modalities may include, but are not limited to, audio, light, haptic, flow rate, distance, pressure, motion, chemical, barometric, humidity, and temperature. Within each of these modalities there is a wide array of specific modalities, or sensor types, as well as a wide array of sensor data types reflecting sensor measurements. As one example, the light modality includes visible (for example, RGB), infrared (IR), ultraviolet (UV), and all other possible subsets of the electromagnetic spectrum. Similarly, all frequency ranges of sound, including audible and inaudible sounds, fall within the audio modality. Furthermore, vibration, pressure, touch or contact data types are associated with the haptic modality.

For purposes of this disclosure, the term "device" may encompass one or more separately powered multiple hardware units at a single location. For example, a sensor device might be embodied as two units, with a first unit including a low-cost physical sensor, a communication unit (wireless or wired), and a battery, and a second unit configured to receive physical sensor data from the first unit and apply a machine learning model to the received physical sensor data. Such embodiments may be useful for further exploiting benefits obtained by use of a low-cost sensor. For example, power requirements for a low-cost sensor, when in a separate unit, may be low enough for it to be powered by a battery for an extended period of time, which may facilitate installation and use of the low-cost sensor. A device may be referred to as a "machine."

As noted above, the use of low-cost physical sensors to identify events is generally more desirable, with consumers seeking to lower the initial purchase cost, and/or the associated operation costs, of the selected sensor. However, such low-cost sensors may not provide the results specifically desired by the consumer. For example, in some cases, a user may wish to capture or collect data about specific targets in a location. Low-cost sensors may not be sufficiently sophisticated or have a resolution high enough to accurately detect the desired target information. However, as noted above, the purchase and/or operation of a high-cost sensor can be associated with several drawbacks. The retailer may need to install the device in an area with increased ventilation to minimize overheating, the device may be larger than optimal for a retail area, obstructing a portion of the storefront, or challenging to blend into the surroundings.

FIG. 1 illustrates an example system 100 for generating a machine learning (ML) model 170 effective for detecting events from a first type of physical sensor data 122 from a first physical sensor 120 with the assistance of a second physical sensor 130 for generating location-specific training data 152. The resulting trained ML model 170 can then be used to detect event instances based on sensor data obtained from the first physical sensor 120 without the use of the second physical sensor 130.

The first physical sensor 120 is positioned in a location 110 and arranged to perform measurements of an environment 112, and generates first sensor data 122 of a first sensor data type based on the performed measurements. The environment 112 may also be referred to as scene 112. In some measurements performed by the first physical sensor 120, a subject 114 within the environment 112 may affect and be recorded in corresponding portions of the first sensor data 122. The first physical sensor 120 may be configured to capture new samples at a selected sampling rate. The second physical sensor 130 is also positioned in the location 110 and arranged to perform measurements of the environment 112, and generates second sensor data 132 of a second sensor data type based on the performed measurements. In some measurements performed by the first physical sensor 120, a subject 114 within the environment 112 may affect and be recorded in corresponding portions of the first sensor data 122. In different examples, the first physical sensor 120 or the second physical sensor 130 may be an IR camera, an RGB camera, a microphone array, or any other type of sensor configured to detect physical phenomena. In some implementations, the first physical sensor 120 and the second physical sensor 130 are of different sensor types for different modalities; for example, the first physical sensor 120 may be a microphone and the second physical sensor 130 may be an imaging camera to detect visual events for training an ML model that recognizes such events from audio data.

Although not necessary in all examples, in some examples it may be preferable for the measurements performed by the first physical sensor 120 to be synchronized with measurements performed by the second physical sensor 130. For example, such synchronization may result in the first sensor data 122 including a sample or group of samples that captured at, nearly at, during, or nearly during the capture of a corresponding sample or group of samples of the second sensor data 132.

A training event detection component 140 (which may be referred to as a "training event detection module") receives the second sensor data 132, detects instances of events of interest, and produces training event instance data 142 corresponding to the detected event instances. In some examples, the training event detection component 140 further performs labeling of the detected event instances, and data corresponding to one or more resulting labels may be included in the training event instance data 142. In some examples, the training event detection component 140 further generates confidence values associated with the detection of event instances, categories, and/or labels, and data corresponding one or more of the confidence values may be included in the training event instance data 142. In some circumstances, the training event detection component 140 may detect multiple concurrent event instances in the second sensor data 132, and generate multiple corresponding items of training event instance data 142.

Where multiple samples of the second sensor data 132 over time reflect occurrence of an event that the training event detection component 140 is configured to identify, multiple items of corresponding training event instance data 142 can result. For example, if the second physical sensor 130 provides the second sensor data 132 as a series of image frames, and the training event detection component 140 is configured to detect the occurrence of human faces in such images, then, in some implementations, a separate training event instance may be identified, and one or more corresponding items of training event instance data 142 generated, for each image frame including a human face, even if training event instance data 142 was generated for the immediately preceding frame for the same human face.

The training data generator 150 (which may be referred to as a "training data generation module") generates location-specific training data 152 by automatically selecting and labeling portions of the first sensor data 122 that correspond to respective items of training event instance data 142 identified by the training event detection component 140 (which in turn are identified based on corresponding portions of the second sensor data 132). In some implementations, due to latency in analyzing the second sensor data 132 to generate corresponding training event instance data 142, the first sensor data 122 may be buffered and selectively retrieved from the buffer based on a time at which measurements were performed by the second physical sensor 130 for identified event instances. In some examples, training event instance data 142 may identify a particular region of interest (such as, but not limited to, a region of interest in the underlying second sensor data 132) and select only a portion of the sensor data 122 that corresponds to the identified region of interest. This allows for a reduction in size of the location-specific training data 152 by omitting portions of the first sensor data 122 that would have little or no effect on training, and corresponding reductions in storage space, bandwidth, and computation for handling of the resulting location-specific training data 152. In some examples, the location-specific training data 152 may include additional metadata, such as the location of capture, time and date of capture, hardware details of the first sensor 120 and/or the second sensor 130 (such as, but not limited to, make, model, and/or resolution), and/or operating parameters of the first sensor 120 and/or the second sensor 130 (such as, but not limited to, sample rate, exposure time, and/or quality setting). The metadata may be used for automatically selecting appropriate training data portions for a particular ML training session.

In some implementations, the training data generator 150 may apply various criteria to select event instances for which location-specific training data 152 is generated. One such criteria may be a similarity of the first sensor data 122 for a current event instance to the first sensor data 122 for a previous event instance. For example, techniques such as fingerprinting, hashing, local feature analysis, or sum of squared difference may be used to determine the first sensor data 132 for the current event instance is too similar to previous first sensor data 132 to be likely to meaningfully improve the current location-specific training data 152. Another such criteria is whether training event instance data 142 indicates a low confidence value (such as below a threshold confidence value), and such event instances may be excluded.

In some implementations, the location-specific training data 152, or selected portions thereof, is incorporated into training data repository 154 (which may be referred to as a "training data storage module"). In some implementations, the location-specific training data 152 may be transmitted to a remote computer server (not illustrated in FIG. 1) configured to maintain the cross-location training data 154 and collect location-specific training data 152 collected from various locations. By collecting training data from various locations, a more generalized trained ML model 170 may be produced. In some implementations, various criteria may be applied for selectively incorporating items of location-specific training data 152 into, or removing training data items from, the training data repository 154. For example, age and/or a number of similar or related training data items in the training data repository 154 may affect the incorporation or retention of training data items in the training data repository 154.

In some implementations, the training data stored in the training data repository 154, or a selected portion, may be received locally from a remote system for use in combination with locally generated location-specific training data 152 to generate the ML model 170. Such implementations are useful for maintaining privacy of events occurring at the location 110, while using training data from other locations to better generalize and improve the robustness of the ML model 170.

An ML model training component 160 (which may be referred to as an "ML model training module") is configured to generate a trained ML model 170 from the location-specific training data 152 and/or training data items obtained from the training data repository 154. In some implementations, the training may be performed remote from the location 100, such as on a cloud server platform offering substantial computation resources for training. In some implementations, the training may be performed locally or within a private network, which is useful for maintaining privacy of events occurring at the location 110. In some implementations, the ML training component 160 is configured to automatically generate multiple different ML models from the same or similar training data for comparison. For example, different ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model 170 may be produced.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), and 2017/0262768 (published on Sep. 14, 2017 and entitled "Depth from Time-of-Flight Using Machine Learning"), which are each incorporated by reference herein in their entireties.

Figure 2:
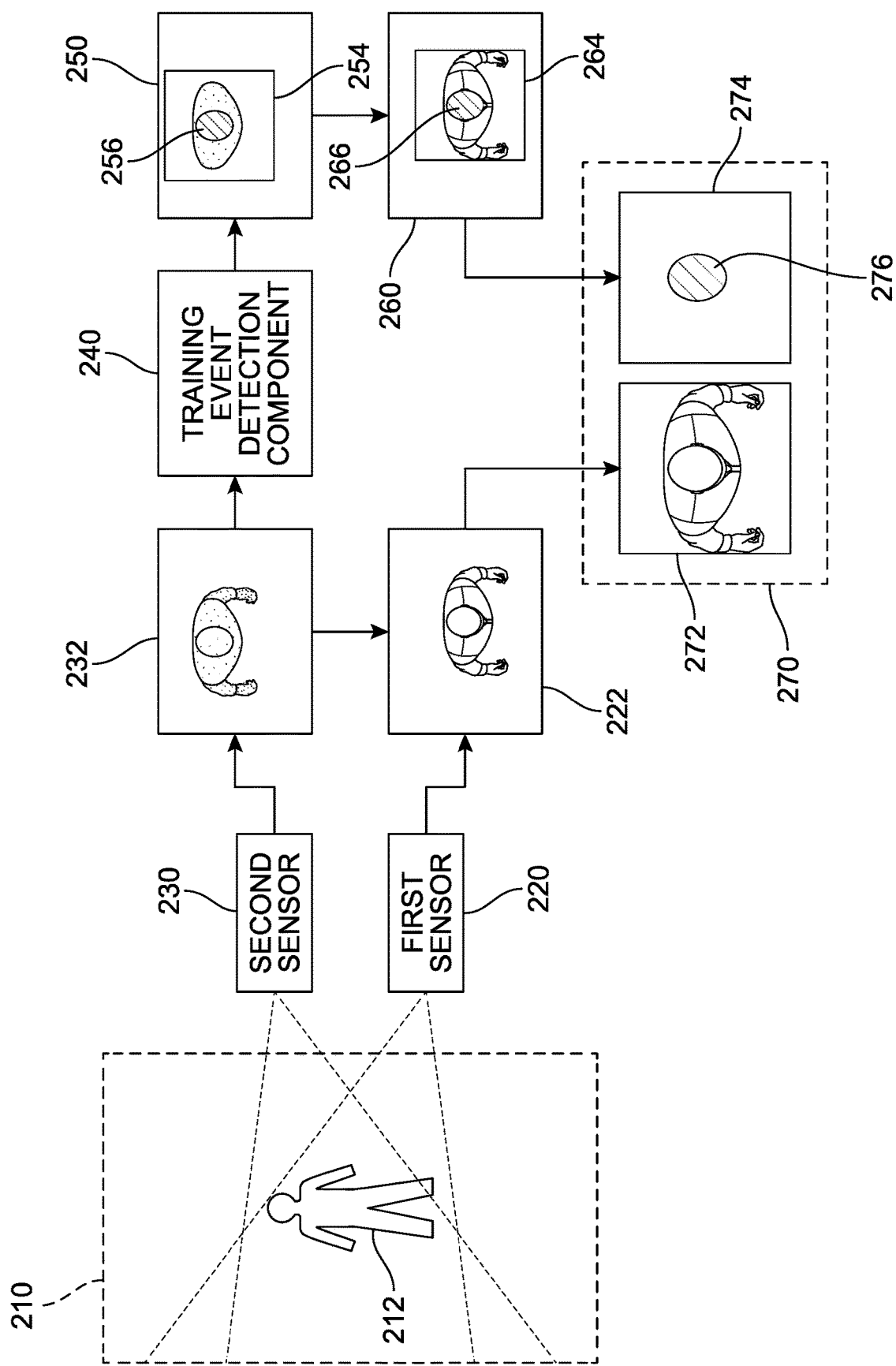
FIG. 2 illustrates an example approach for generating training data, which may be implemented on the system illustrated in FIG. 1 and incorporate various features described for that system.

FIG. 2 illustrates an example approach for generating training data 270, which may be implemented on the system 100 illustrated in FIG. 1 and incorporate various features described for that system. Although FIG. 2 illustrates generating training data for a particular point in time, it is understood that the described techniques may be applied to sensor data obtained by the first and second physical sensors 220 and 230 at other times, and over successive samples (for example, successive image frames captured at a particular frame rate). FIG. 2 includes a first physical sensor 220 and a second physical sensor 230 which are both arranged to perform measurements of an environment 210 which, at the time illustrated in FIG. 2, includes a human subject 212. The above description for the first and second physical sensors 120 and 130 in FIG. 1 apply to the first and second physical sensors 220 and 230, respectively. In the example illustrated in FIG. 2, the first physical sensor 220 is an RGB or IR optical imaging camera arranged to capture overhead images of people, such as the human subject 212, as they pass through the environment 210. For example, the first physical sensor 220 may be mounted on a ceiling. A first sensor data 222, in the form of an RGB or IR image, has been obtained from the first physical sensor 220, and includes measurements corresponding to a position of the human subject 212.

The second physical sensor 230 is a depth imaging camera, such as but not limited to, a time-of-flight IR depth camera (such as a Microsoft Kinect), similarly arranged to capture overhead depth images of people, such as the human subject 212, as they pass through the environment 210. For example, the first physical sensor 220 may be mounted on a ceiling. A second sensor data 232, in the form of a depth image in which pixel values correspond to estimated distances from the second physical sensor 230, has been obtained from the second physical sensor 230 and includes values based on measurements performed by the second physical sensor 230 at approximately the same time that the first sensor data 222 has captured by the first physical sensor 220. In some implementations, the first physical sensor 220 and the second physical sensor 230 are positioned closely to reduce parallax effects, which simplifies and reduces errors.

The second sensor data 232 is provided to a training event detection component 240 (which may be referred to as a "training event detection module"). The training event detection component 240 may include the various features described above for the event detection component 140 in FIG. 1. In this particular example, the training event detection component 240 is configured to detect events in which a human subject has been captured in overhead depth image data, such as the second sensor data 232, and each detected human reported as an event instance (although in some examples, multiple humans might be reported as single event instance). Also, although the example training event detection component 240 analyzes individual depth images, in other examples, data from other depth images captured by the second physical sensor 230 or previously generated event instance data may be considered. In this example, a human-programmed algorithm is used for event detection, although in other examples an ML model may be applied to detect events. The training event detection component 240 identifies a first portion of the depth image 232 in which the estimated distances lie within a typical range for human heads. The first portion of the depth image 232 is then analyzed for blobs of contiguous pixels that are within the established range of sizes of human beings. In some circumstances, such as when multiple people are in the portion of the environment 210 measured by the second sensor 230, multiple blobs may be identified for respective human subjects.

For each blob that is identified, a point within the blob that is closest to the second physical sensor 230 (with a distance T) is identified, which is presumed to be the top of a human head. An estimated head height H is selected, based on an established range of heights for human heads (and in some examples, selecting a height based on an area of a blob). Then, a second portion of the depth image 232 is identified in which the estimated distances are between T and (T+H). Examining the second portion of the depth image 232, a computer vision library (such as, but not limited to, OpenCV) is applied to identify an ellipse within the second portion of the depth image 232 with a circumference which is within an established range of circumferences of human heads. If such an ellipse is identified, it is determined that the blob corresponds to a human subject (or more specifically, a head of a human subject). This process is repeated for the other blobs identified in the first portion of the depth image 232.

In the example illustrated in FIG. 2, only one human—the human subject 212—has been detected by the training event detection component 240, and a single corresponding item of training event instance data is generated for the time corresponding to the depth image 232. In this example, the training event instance data includes a marked depth image 250 which identifies the pixels included in the blob as a mask 256 and also illustrates a square or rectangular bounding box for the identified human. In some examples, the bounding box may be a fixed size centered at the center of the ellipse, or additional pixels in the depth image 232 may be identified as likely corresponding to the detected human and the bounding box arranged to surround the identified additional pixels. The training event instance data may include information such as, but not limited to, identification of the pixels included in the mask 256, position and size of the bounding box 254, and/or a two-dimensional position of a center of the blob or ellipse.

The training event instance data is provided to a training data generator (which may include the various features described for the training data generator 150 in FIG. 1). The training data generator transforms the various pixel positions indicated by the training event instance data (for example, pixels included in the mask 256 or positions for bounding box 254) from depth image coordinates (and in some examples, their distance estimate values in the depth map 232) to positions in first sensor data 222. For example, this transformation may account for parallax effects resulting from the different positions of the first and second physical sensors 220 and 230. In some implementations, this transformation may instead be done by the event detection component 240. Marked image 260 illustrates a bounding box 264 and mask 266 for the first sensor data 222, resulting from performing such a transformation to the bounding box 254 and mask 256 in the marked depth image 250.

In the example illustrated in FIG. 2, the training data generator then generates location-specific training data 270. In this example, the location-specific training data 270 includes a selected portion 272 of the first sensor data 222. In this case, the selection portion 272 is the portion of the first sensor data 222 within the bounding box 264. The location-specific training data 270 also includes a mask 274 indicating marked pixels 276 indicated by the mask 266. By including only a selected portion 272 of the first sensor data 222 in the location-specific training data 270, and omitting the remainder of the first sensor data 222 that would have little or no effect on training, this allows reductions in storage space, bandwidth, and computation for handling the location-specific training data 270. However, in some examples, all of the first sensor data 222, substantially all of the first sensor data 222, or a predetermined portion first sensor data 222 may instead be included in the location-specific training data 270. Other features described for location-specific training data 152 may also be applied to the location-specific training data 270.

The location-specific training data 270, along with additional training data, whether obtained for the location shown in FIG. 2 or from other locations, is then used to generate an ML model, as described above in connection with location-specific training data 152, training data repository 154, ML model training component 160, and trained ML model 170 in FIG. 1. With appropriate training data, the resulting trained ML model will be effective in identifying the presence of humans in sensor data provided by other low-cost physical sensors identical to or similar to (for example, generating the same type of data, such as RGB image or IR image data) the first physical sensor 220 and other such sensors used to generate the training data. Additionally, the resulting trained ML model does not use sensor data from a high-cost physical sensor similar to the second physical sensor 230. Depending on factors such as the diversity of environments for which training data is obtained, the diversity of observed and labeled phenomena, and the size of the trained model, the resulting trained model may be sufficiently generalized to be effective in many circumstances with a low-cost sensor. In some examples, the resulting trained ML model is optimized for the particular location 210. This can increase accuracy and performance and lower costs by making hardware with low processing resources effective for detecting events.

In FIG. 2, the first physical sensor 220 is a low-cost sensor relative to the high-cost sensor physical sensor 230. For example, a depth camera in general has higher costs in terms of volume, size, power consumption, monetary cost, and computing demands than an RGB or IR imaging camera. However, as illustrated below, the depth camera 230 is advantageous for the illustrated training data collection, as it uses a measurement technique that is insensitive to many differences that may be encountered at different locations, and a robust analysis technique is available that provides reliable and consistent identification of the event of interest in this application. It is noted that for the first physical sensor 220, other types of low-cost physical sensors than RGB or IR imaging sensors, individually or in combination, may be effective for detecting events of interest when used with an appropriately trained model, and similarly used for generating training data. It is also noted that for the second physical sensor 230, other types of high-cost physical sensors than depth cameras, individually or in combination, may be effective for detecting events to generate training data. It is also noted that ML models may be similarly generated and applied to recognize other types of events on using the same underlying hardware.

Figure 3A:
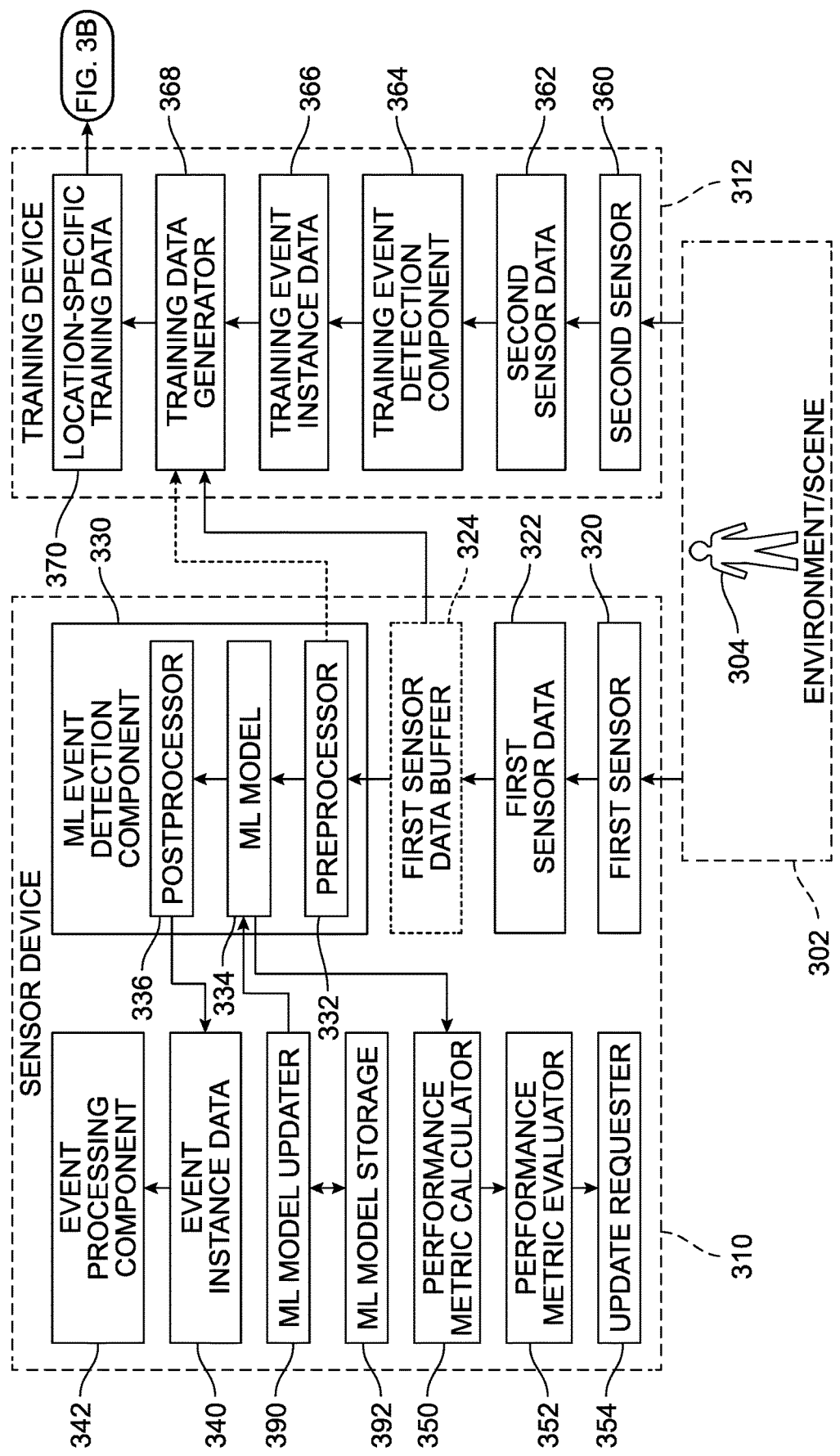
FIGS. 3A and 3B illustrate an example architecture for generating initial and updated ML models effective for event detection using low-cost sensors, and application of the resulting ML models for event detection.
Figure 3B:
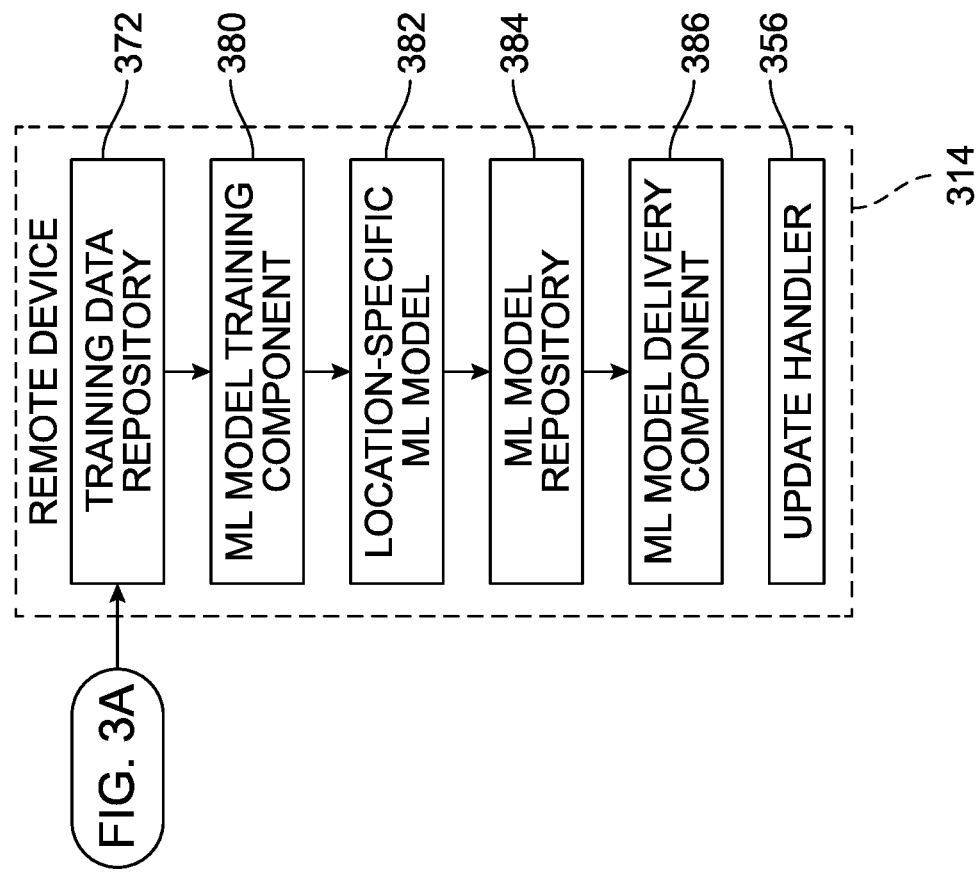

FIGS. 3A and 3B illustrate an example architecture 300 for generating, with the assistance of a high-cost sensor, initial and updated ML models effective for event detection using low-cost sensors, and application of the resulting ML models for event detection using a low-cost sensor without assistance from a high-cost sensor. FIGS. 3A and 3B illustrate a first set of elements as being included in a sensor device 310, a second set of elements as being included in a training device 312, and a third set of elements as being included in a remote system 314. It is understood this particular arrangement of the illustrated elements is merely illustrative, and that in other implementations the illustrated elements may be arranged differently. For example, in some implementations, the first and second sets of elements are included in a single device. In some implementations, elements 372, 380, and 382 are included in training device 312. Additionally, in some implementations, some of the elements may be omitted, additional elements may be included, and/or some of the elements may be included in additional devices or systems not illustrated in FIGS. 3A and 3B.

The sensor device 310 is configured to, among other things, apply trained ML models, such as the trained ML model 170 in FIG. 1 or the trained ML models described in FIG. 2, to first sensor data 322 obtained from a low-cost first physical sensor 320. The various features and applications for the physical sensors 120 and 220 may also apply to the first physical sensor 320. The first physical sensor 320 is of a first physical sensor type, and is arranged to measure physical phenomena occurring in an environment 302. The measured physical phenomena may be affected by various events of interest, such as, but not limited to, the presence and/or actions of human subjects, such as human subject 304. First sensor data 322 is generated based on the measurements performed by the first physical sensor 320.

The first sensor data 322 is provided as samples, each based on one or more measurements performed during a respective point and/or period of time. In some examples, the first physical sensor 320 may be configured to periodically generate new samples at a sampling rate. For example, an imaging sensor may be configured to operate at a sampling rate (which may be referred to as a "frame rate" for an imaging sensor) of 10 samples per second, with each sample being an image frame captured by the imaging sensor. As another example, a monaural sound sensing device may generate samples at a significantly higher sampling rate, such as 16000 samples per second, with each sample being just a single amplitude value. In some implementations, high sampling rate sensor data may be grouped into sets of multiple samples for processing. For example, sound sensor data might be grouped into frames containing 100 milliseconds worth of samples. In some examples, the size of such a group of samples may be selected to correspond to, and may be synchronized with, a sampling rate of another physical sensor.

In some examples, samples of the first sensor data 322 may be temporarily stored in a first sensor data buffer 324 (which may be referred to as a "first sensor data buffer module"). For example, operation of an ML event detection component 330 (which may be referred to as an "ML event detection module") may involve first sensor data 322 from a current sample, but additionally first sensor data 322 from one or more preceding or succeeding samples as well. Additionally, where the first sensor data 322 is being obtained for generating training data, the first sensor data buffer 324 may be used to accommodate latency in detecting events based on sensor data collected by a high-cost sensor.

When the sensor device 310 is being used to apply an ML model 334 (for example, a previously trained ML model) to detect events based on the first sensor data 320, rather than for generating training data, the first sensor data 322 (in some examples via the first sensor data buffer 324) is provided to the ML event detection component 330, which is configured to detect event instances based on the first sensor data 322 by applying the ML model 334. Although in some examples the ML model 334 is configured to directly receive and process the first sensor data 322, in other examples, the ML event detection component 330 is configured to, using a sensor data preprocessor 332 (which may be referred to as a "sensor data preprocessing module"), generate preprocessed sensor data based on the first sensor data 322, which is provided to the ML model 334. The preprocessor 332 may apply various operations to the first sensor data 322, such as, but not limited to, cropping, data selection, scaling (for example, to a fixed size), filtering, sampling, decimation, blurring, Fourier transform, normalization, sorting, clustering, gradient calculation, mean subtraction, whitening, dimensionality reduction, segmentation, matrix operations, background subtraction, convolution, calculating new features from multiple data values, feature detection, distortion correction, and/or edge detection. The preprocessor 332 may collect and process a sequence of sensor data items, such as successive samples. In some examples, the preprocessor 332 is configured to selectively identify portions of the first sensor data 322 to which the ML model 334 is applied; for example, a two-dimensional image might be processed to identify and/or enhance a subportion of the image for analysis using the ML model 334. In some implementations, the preprocessor 332 is reconfigurable, and the operations performed by the preprocessor 332 are determined based on which ML algorithm is being used to apply the ML model 334. For example, a first set of operations may be performed for a random decision forest, and a different second set of operations may be performed for a deep learning algorithm. In some implementations, the preprocessor 332 may also be applied to the first sensor data 322 for generating the location-specific training data 370, to produce training data in the same form that is supplied to the trained ML model 334.

The trained ML model 334 specifies parameters for operation of one or more associated ML algorithms to be applied by the ML event detection component 330 for detecting events from the first sensor data 322. In some examples, a sequence of ML algorithms may be applied, with earlier ML algorithms generating intermediate data received and processed by subsequent ML algorithms. The result of applying the ML model 334 may be provided in various forms, depending on the underlying ML algorithm and the desired event instance data. For example, the result may provide a classification for an event instance and/or provide estimated values. In some examples, the result may include confidence values (which may be referred to a "certainty values" or "certainties") for classifications or values.

Although in some examples results from applying the ML model 334 may be directly incorporated into event instance data 340, in other examples, the ML event detection component 330 is configured to, using a sensor data postprocessor 336 (which may be referred to as a "sensor data postprocessing module"), perform postprocessing of the results of applying the ML model 334. In some examples, the postprocessing may include evaluation of confidence values, such as comparison against one or more threshold values, to determine whether an event has been detected and a corresponding item of event instance data 340 is to be generated.

Where the ML event detection component 330 detects an event instance based on the first sensor data 322 by applying the ML model 334, the ML event detection component 330 generates a corresponding item of event instance data 340. The event instance data 340 may include various features described for training event instance data 142 in FIG. 1, such as, but not limited to, metadata for associated with the first physical sensor 320 or first sensor data 322 corresponding to the event instance. The sensor device 310 further includes an event processing component 342 (which may be referred to as an "event processing module") configured to receive and process the event instance data 340.

In a non-limiting example, the first physical sensor 320 is a low-cost sensor similar to the first physical sensor 220 and the ML model 334 has been trained as described in FIG. 2. As a result, the ML event detection component 330 generates event instance data 340 detecting the presence and movements of people, such as the human subject 304, through the environment 302 (for example, an ingress and/or egress area for an area of interest). With further processing of this event instance data 340, the event processing component 342 may be configured to count of numbers of people entering and exiting the area of interest. For example, based on positions identified for humans across successive samples of the first sensor data 322 (for example, RGB or IR image frames captured at a frame rate, such as 10 Hz), directions of travel can be determined based on changes in the identified positions and used to identify entering and exiting people. By deploying such sensor devices configured in this manner at each ingress and/or egress area of significance (for example, an employee-only doorway may not be monitored) for the area of interest, numbers of people inside the area of interest may be automatically estimated, even where the area of interest itself is not directly tracked by camera, based on the measurements performed by the low-cost sensors included in the sensor devices.

The sensor device 310 is further configured to self-monitor the performance of the ML model 334 with the environment 302, as there may be circumstances in which a particular trained ML model does not perform as expected under certain conditions. For example, the ML model 334 may not be sufficiently generalized to effectively identify events based on the first sensor data 322 under conditions occurring at the environment 302. To identify such circumstances, the sensor device 310 includes a performance metric calculator 350 (which may be referred to as a "performance metric calculation module") and a performance metric evaluator 352 (which may be referred to as a "performance metric evaluation module"). The performance metric calculator 350 is configured to measure, calculate, and/or record a performance metric based on the application of the ML model 334 currently being used by the ML event detection component 330. In some implementations, calculation of a performance metric is performed in whole or in part by the ML model 334 or the ML event detection component 330 in the process of detecting events. In some examples, the performance metric may include confidence values for results output by the ML model 334, results output by the ML model 334, execution time of the ML model 334 and/or the ML event detection component 330, and/or power consumption attributed to the ML model 334 and/or the ML event detection component 330. Calculation of the performance metric can occur at predetermined times, at regular intervals, and/or can be calculated in response to instructions received from the remote system 314. Multiple types of performance metrics may be calculated, reflecting various aspects of the effectiveness of the ML model 334. In some examples, second sensor data 362 may be collected and used occasionally to calculate a performance metric and/or for comparison against a performance metric, to assist in determining accuracy.

The performance metric evaluator 352 is configured to automatically determine whether one or more performance metrics provided by the performance metric calculator 350 are not within expected parameters. Evaluation of a performance metric may account for expected and/or observed patterns. For example, an event of interest may rarely occur while an area is closed during the night. In some implementations, an expected parameter may be predetermined. For example, the ML model 334 may be expected to generate certain results with a predetermined minimum confidence value, or the performance metrics may be expected to have predetermined statistical properties (such as within a minimum, maximum, or range of mean or variance values). In some implementations, an expected parameter may be determined based on a history of previously calculated performance metrics, considered on various time scales and/or periods. For example, a performance metric may be determined to have varied to an unexpected degree over the course of a day, which may reflect periodic or recurring changes in the environment 302 that are not favorable for the current ML model 334. As another example, an expected parameter may be determined based on long-term observation of a performance metric, a shift of the performance metric outside of the expected parameter may reflect a change in the environment 302 that is not favorable for the current ML model 334. Some techniques that may be applied for identifying anomalies in performance metrics are discussed in U.S. Patent Application Publication Number 2015/0269050 (published on Sep. 24, 2015 and entitled "Unsupervised Anomaly Detection for Arbitrary Time Series"), which is incorporated herein by reference in its entirety. In some implementations, an event may be logged in response to a performance metric not being within expected parameters. In some implementations, various parameters or settings may be selected for the performance metric evaluator 352, which may be set by a manufacturer of the sensor device 310 and/or adjusted by an end user.

In response to the performance metric evaluator 352 determining that a performance metric is not within expected parameters, the sensor device 310 is configured to automatically perform one or more actions to obtain an updated ML model 334 that is more effective for the environment 302. In some implementations, the sensor device 310 may include an ML model storage 392 storing one or more alternative ML models, and an ML model updater 390 configured to replace the current ML model 334 with another ML model retrieved from the ML model storage. As will be described in more detail in later examples, if the training device 312 or the high-cost second physical sensor 360 is arranged to perform measurements of the environment 302, the sensor device 310 may enter a retraining mode during which it generates location-specific training data 370 to train a new ML model, much as previously described in FIGS. 1 and 2. While operating in this retraining mode, the sensor device 310 may also continue to apply the current ML model 334 until a new ML model is provided.

In some implementations, the performance metric evaluator 352 is configured to invoke an update requester component 354 (which may be referred to as an "update requester" or an "update request module") configured to communicate with an update handler 356 included in another system, such as the remote system 314. The update handler 356 may be referred to as an "update handling module." In different implementations, the update requester 354 can provide information including an alert, request, notification, details regarding the performance metric, and/or data that was collected during a period of time during which the performance metric was not within expected parameters. In some examples, the update handler 356 is configured to determine if one or more alternative ML models is available in an ML model repository 384, and deliver any such ML models to the sensor device 310 for use by the ML model updater 390. This determination may be based on information provided by the update requester about the sensor 310 or the environment 302, to select potentially suitable ML models.

In different implementations, the sensor device 310 and/or the remote server 314 may initiate, execute, or engage a retraining procedure. In some implementations, a retraining procedure refers to a process or steps involved in generating new location-specific training data 370 and training a new location-specific ML model 382 that is more effective for use by the particular sensor device 310 and its corresponding environment 302. In one implementation, this may result in an ML model that is customized for the context and requirements of the sensor device 310. In different implementations, the retraining procedure can include a series of operations that automatically trigger an installation and/or operation of a high-cost second physical sensor 360 in proximity to the low-cost first physical sensor 320. In one implementation, the retraining procedure can include automatic shipping and/or delivery of the training device 312 including the high-cost second physical sensor 360. The retraining procedure may include selection of the training device 312 and/or the high-cost second physical sensor 360 based in part on information provided by the update requester 354. In some implementations, the retraining procedure can further involve an automatic update of software instructions for execution by the sensor device 310, such that the sensor device 310 is configured to link with and/or work in conjunction with the training device 312 and/or the high-cost second physical sensor 360, although in other implementations, this configuration may have been previously included in the sensor device 310 as originally installed. Once the training device 312 and/or the high-cost second physical sensor 360 is in operation at the environment 302, the sensor device 310 can enter the above-mentioned retraining mode.

The training device 312 is used in combination with the sensor device 310 to generate location-specific training data 370, much as described in FIGS. 1 and 2. Much as described in the examples in FIGS. 1 and 2, while operating in a retraining mode, the high-cost second physical sensor 360 collects second sensor data 362 concurrent with the low-cost first physical sensor 320 collecting first sensor data 322. In some implementations, the first physical sensor 320 is of a first physical sensor type (capable of detecting events in a first modality), and the second physical sensor 362 is of a different second physical sensor type (capable of detecting events in a second modality). In some implementations, the first sensor data 322 is of a first sensor data type, and the second sensor data 362 is of a different second data type. However, in some examples, the first and second physical sensors 320 and 360 may be of the same sensor type and/or provide sensor data of the same sensor data type. In some implementations, the difference between the first and physical sensors 320 and 360 sensors may relate to a resolution, speed, dynamic range, sensitivity, and/or noise of each sensor. For example, the first physical sensor 320 can be a low-resolution IR camera, while the second physical sensor 360 an IR camera with a higher resolution. In one non-limiting example, both of the first and second physical sensors 320 and 360 may be IR imaging cameras used in combination to provide stereoscopic depth data, and the second physical sensor 360 is considered to be high-cost due to its added monetary cost and additional power required to operate it.

Much as described in FIGS. 1 and 2, a training event detection component 364 (which may be referred to as a "training event detection module") receives the second sensor data 362 and generates corresponding training event instance data 366. In some implementations, the training event detect component 364 is configured to apply an ML model for event detection, much as described for the ML event detection component 330. Much as described in FIGS. 1 and 2, a training data generator 368 (which may be referred to as a "training data generation module") is configured to receive the training event instance data 366 and generate corresponding location-specific training data 370 based on corresponding first sensor data 322. As noted above, in some examples, data based on the first sensor data 322 may be obtained from the first sensor data buffer 324 and/or the preprocessor 332 for generating the location-specific training data 370. When the sensor device 310 is operated in the retraining mode, the preprocessor 332 may be configured to perform additional operations for generating training data. In some examples, use of data provided by the preprocessor 332 may eliminate or reduce privacy-related issues that might occur with using the first sensor data 322 directly. For example, providing feature data rather the original sensor data, blurring, and/or subsampling may effectively obscure or remove personally identifiable information.

Much as described in FIG. 1, the location-specific training data 370 may be selectively included in a training data repository 372 (which may be referred to as a "training data storage module"). In some examples, the training data repository 372 may also include training data obtained for multiple different locations and diverse environments. In some implementations, as illustrated in the example in FIGS. 3A and 3B, the training data repository 372 may be maintained by a remote system. In some examples, the location-specific training data 370 generated for the environment 302 may be used for training ML models used for other environments, which may further generalize the resulting ML models. For example, a portion of the location-specific training data 370 may be included in a training data set used to generate a "default" generalized ML model.

Training data obtained from the training data repository, including location-specific training data 372, is used by an ML model training component 380 (which may be referred to as an "ML model training module") to produce a location-specific model 382, much as described in FIG. 1. The newly obtained location-specific training data 370, as well as other location-specific training data included in the training data repository 372 from previous training, may be preferentially weighted. In some examples, multiple different location-specific training models may be generated. In some implementations, the ML model training component 380 is configured to generate a location-specific training model 382 that, in combination with other computing activities performed by the sensor device 310, can achieve real-time performance. This may affect a selection of an ML algorithm or an ML model size. Accordingly, where sensor device 310 provides fairly low computational resources, such as an Internet of Things (IoT) device, a less computationally intensive ML algorithm, such as a decision tree or random decision forest, may be selected over a deep learning algorithm such as a convolution neural network.

In some implementations, a location-specific training model 382 may be stored in an ML model repository 384 (which may be referred to as an "ML model storage module"), and later made available for use in environments other than the environment 302. The location-specific model 382 is provided to the sensor device 310 by an ML model delivery component 386 (which may be referred to as an "ML model delivery module"). The received location-specific model 382 is used by the ML model updater 390 to reconfigure the ML event detection component 330 to apply the newly trained location-specific model 382.

In some implementations, in response to reconfiguring the ML event detection component 330 with an ML model previously unused by the sensor device 310 or for the environment 302 (for example, the newly trained location-specific ML model 382), the sensor device 310 and the training device 312 may temporarily operate in a testing mode, in which the training device 312 continues to generate training event instance data 366, providing a "ground truth" which is compared against event instance data 340 resulting from applying the new ML model 334. In some examples, where the event instance data 340 and the training event instance data 366 differ significantly, corresponding items of location-specific training data 370 may be produced. Once a new ML model 334 is determined in the testing mode to be effective for the environment 302 (based on the comparison against the training event instance data 366), the sensor device 310 may return to a normal operating mode and end use of the second physical sensor 360 and/or the training device 312 for generating training event instance data 366. Where the training device 312 has been temporarily installed to generate the location-specific training data 370, it may be removed. In the event that the new ML model 334 is not determined in the testing mode to be effective for the environment 302, the sensor device 310 and the training device 312 may return to the retraining mode to generate additional location-specific training data 370 and/or the ML model training component 380 is used to generate a new location-specific model 382. With each such training cycle, location-specific training data 370 from a current training cycle, and perhaps location-specific training data 370 from recent training cycles, may be more strongly weighted in an effort to produce location-specific ML models 382 that are increasingly tuned to the environment 302.

It is noted that the examples illustrated in FIGS. 1 and 3 may utilize multiple physical sensors (which may be of different types) in combination, in place of the first physical sensors 120 and 310. Additionally, the examples illustrated in FIGS. 1 and 3 may utilize multiple physical sensors (which may be of different types) in combination, in place of the second physical sensors 130 and 340.

Figure 4:
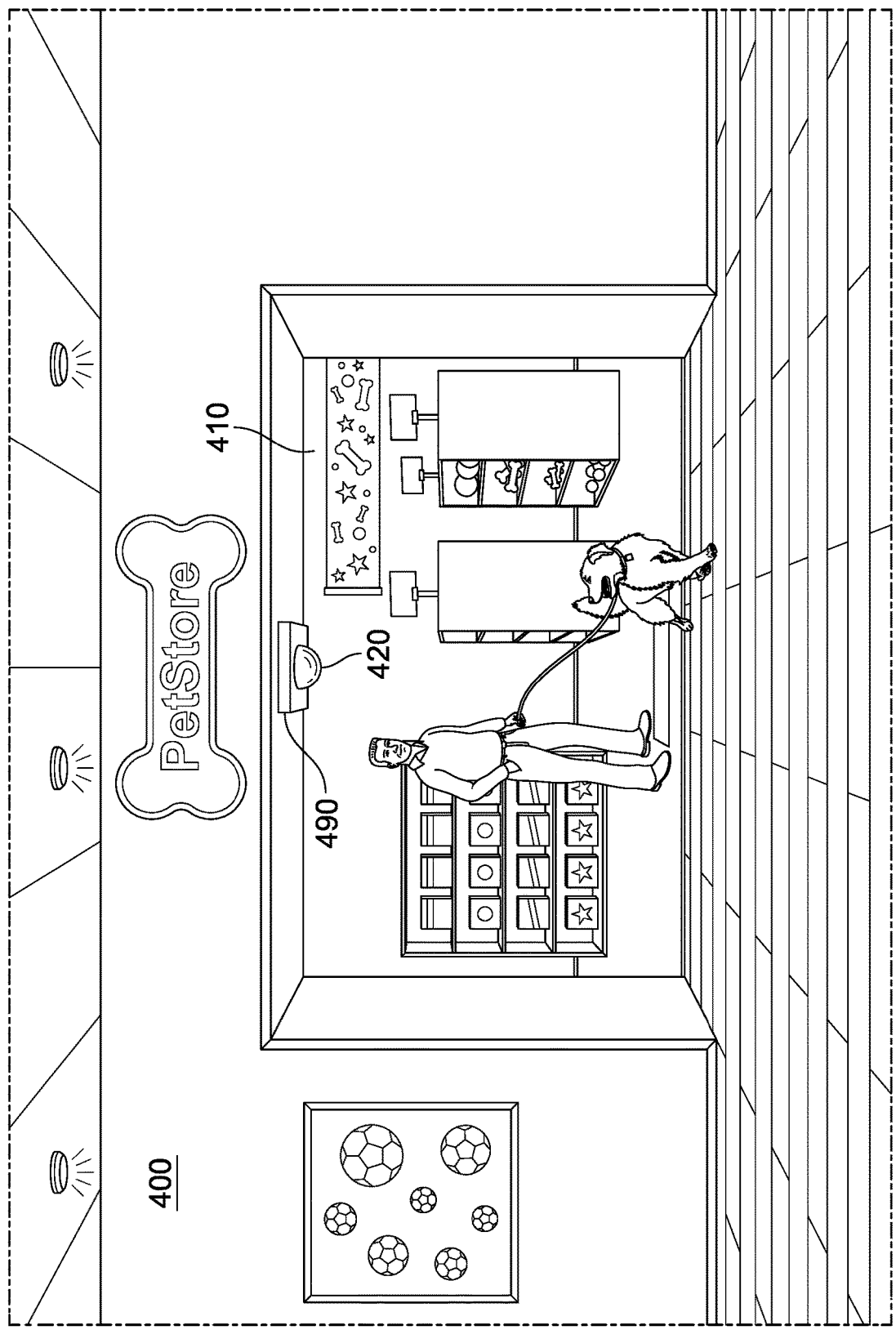
FIG. 4 illustrates a section of an indoor retail outlet or indoor mall.

Referring now to FIGS. 4-7, a sequence of figures illustrates one possible application of the disclosed systems and methods. It should be understood that the following illustration is for purposes of example only, and a wide variety of other implementations are possible for applying the disclosed systems and methods. In FIG. 4, a section of an indoor retail outlet or indoor mall 400 is shown. The indoor mall 400 may include several retail spaces, including a first retail space 410, which is a pet store. In this example, a retailer operating the pet store 410 may be interested in converting a portion of the first retail space 410 to one that specializes in dog grooming and training. However, before committing to this project, the retailer wants to ascertain whether the retail space 410 is popular with dog owners. The retailer has obtained a first sensor device ("first device") 490 that includes a first physical sensor ("first sensor") 420. The first sensor device 490 is configured and operates much as described above for the sensor device 310 illustrated in FIG. 3A, and applies a pretrained ML model to identify events based on sensor data obtained from the first physical sensor 420. In the particular example illustrated in FIG. 4, the first physical sensor 420 is a low-cost RGB or IR imaging sensor, as described for the first physical sensor 220 in FIG. 2.

The retailer has installed the first sensor device 490 above the entryway to the retail space 410, such that the first physical sensor 420 is arranged to capture overhead images of people and pets traveling through the entryway (which is a portion of an environment being measured by the first physical sensor 420). The retailer has installed the first sensor device 490 with the objective of ascertaining numbers of people who come into the retail space 410, including counts of people who walk with dogs and counts of people who do not walk with dogs. Training of the ML model applied by the first sensor device 490 to detect such events has been performed similarly to the training described in FIG. 2, using a high-cost depth camera as a second physical sensor, but with the training event detection component 140 further configured to identify locations of dogs based on depth image data. For example, for identifying a dog, a similar approach may be applied to first identify a head, which may be accompanied by confirming an oblong body portion, at a greater distance from the depth camera than the head, extends away from the head. Additional features and techniques described in FIGS. 1 and 3 for generating training data (including obtaining training data at multiple locations in diverse environments) and training an ML model may also be applied. It is noted that the application illustrated in FIG. 4 is not limited to the use of a low-cost RGB or IR imaging sensor and a high-cost depth camera; various other physical sensor types may also be successfully applied. For example, a thermal imaging sensor may be used as a high-cost sensor. It may be generally understood that thermal imaging sensors permit detection of events even in poor contrast contexts and in situations where light is dim or in total darkness. Because thermal imaging sensors 'see' emitted infrared heat rather than reflected light energy, events can be much more readily discerned than with low-cost RGB or IR cameras. However, thermal imaging sensors are far more expensive to manufacture than low-cost RGB or IR cameras.

Much as discussed in FIGS. 3A and 3B regarding counting people based on ML model results, similar postprocessing may be performed to distinguish people with dogs from people without dogs and produce respective counts. Furthermore, in some implementations, the ML model can be trained to categorize dogs according to size (such as small, medium, and large), and this additional information may be used to record the number of people who visit the retail space 410 with large dogs, which the retailer believes are more likely to be brought for training.

Thus, although it may have been impossible, impractical, and/or unreliable with conventional techniques to use the low-cost first physical sensor 420 to detect the events of interest (people, dogs, and/or determining sizes of dogs) based on the RGB or IR image data provided by the first physical sensor 420, with use of the above trained ML model, the first sensor device 490 is able to accommodate the data type of the low-cost first physical sensor 420 and produce results that are substantially similar to the results that would be obtained using a high-cost physical sensor, such as a depth camera. In other words, despite potential shortcomings or limitations of the hardware of first physical sensor 420, the first device 490 is nevertheless capable of reliable, accurate detection of event instances of interest. Through the use of the disclosed techniques, various benefits of using a low-cost physical sensor instead of a high-cost sensor can be exploited, such as, but not limited to, reduced size or volume, reduced power, reduced computational resources, and/or reduced monetary cost.

Much as previously discussed in FIGS. 3A and 3B, in order to ensure an ML model applied by a sensor device is effective for detecting events at a particular location or environment, some implementations include features that allow for automated self-assessment of ML model performance, automated generation of location-specific ML models, automated verification of event detection accuracy, and/or automatic communications with a remote server or network. Furthermore, in different implementations, the sensor device can include provisions for recognizing, notifying, communicating, transmitting, and/or requesting a training modification, adjustment, correction, update, or any other change to the originally or currently installed ML model. In addition, the sensor device can include provisions for receiving new data, information, algorithms, ML models, and/or instructions, as well as the capacity for executing provided instructions or integrating provided information into the sensor device. The various elements and techniques described in FIGS. 3A and 3B may be applied in connection with the first sensor device 490.

Figure 5:
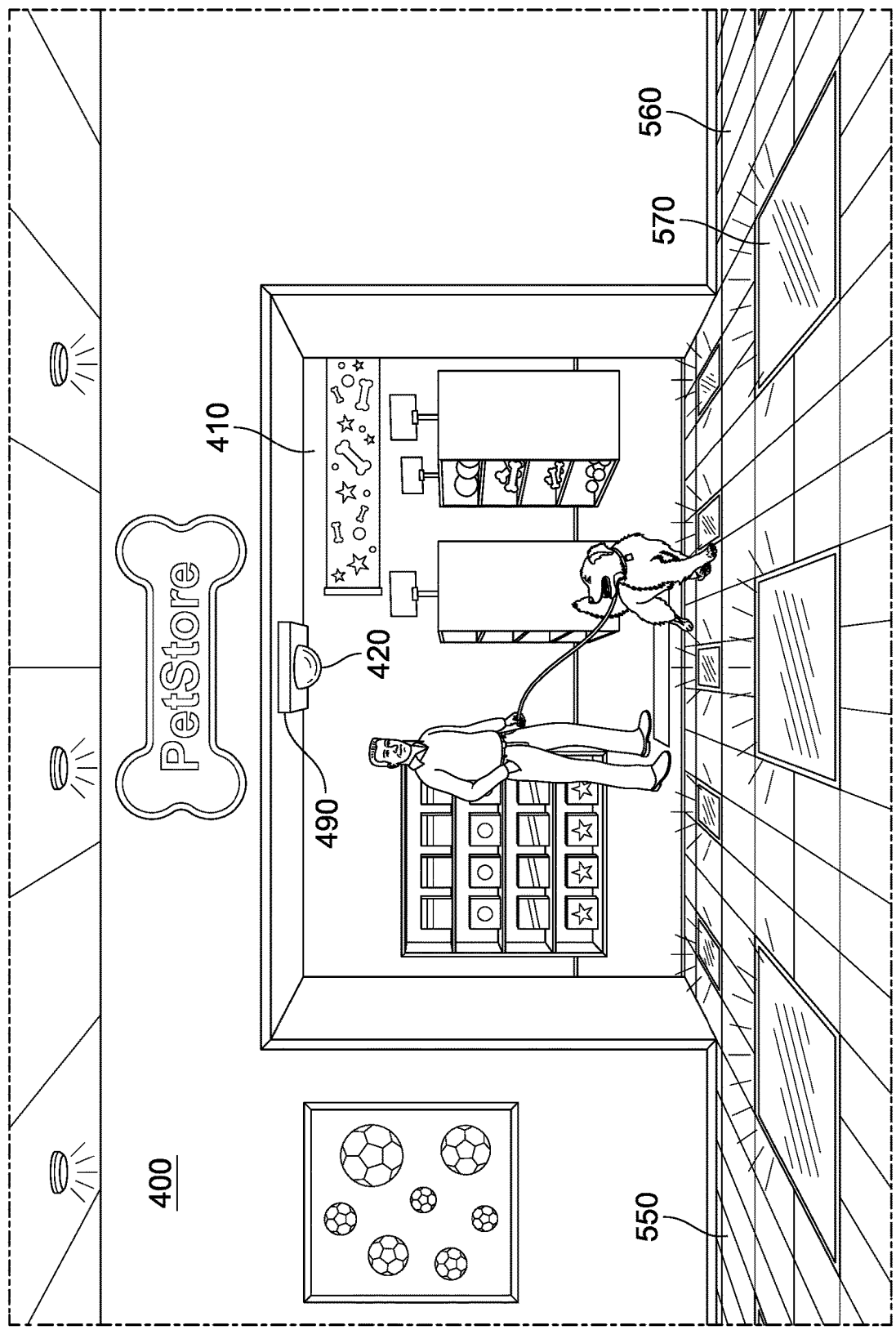
FIG. 5 illustrates an example in which the environment of FIG. 4 has changed to a degree that the ML model being applied has become less effective.

FIG. 5 illustrates an example where the environment in which the sensor device 490 in FIG. 4 is installed has changed to a degree that the ML model being applied by the sensor device 490 has become substantially less effective at detecting events using the low-cost first physical sensor 420. For purposes of illustration, FIG. 5 depicts the first retail space 410 and the first sensor device 490 after the indoor mall 400 has undergone a substantial cosmetic renovation. For example, flooring 550 in a corridor in front of the first retail space 410 and extending into the entryway of the first retail space 410 has been changed from the wood floor shown in FIG. 4 to include regions covered with glass tiles 560 (which are significantly more reflective than the previous wood flooring) and underfoot lighting 570 disposed beneath the glass tiles 460 or other translucent sections of the flooring 550. Such substantial alterations to an environment can occur as a result of attempts to improve an ambience of the indoor mall 400, or maintenance, construction, renovation, change in ownership, seasonal changes, lighting, materials, and other significant alterations in the environment.

As previously described for the performance metric calculator 350 in FIG. 3A, the first sensor device 490 is configured to automatically calculate a performance metric based on application of a current ML model to detect events based on sensor data obtained from the low-cost first physical sensor 420. Further, the first sensor device 490 may be further configured to automatically determine that a performance metric is not within expected parameters, as described for the performance metric evaluator 352 in FIG. 3A. The first sensor device 490 may be configured to respond to a determination that a performance metric is not within expected parameters as described for the sensor device 310 illustrated in FIG. 3A. For example, one or more communications may be automatically transmitted to a remote system, such as the remote system 314 illustrated in FIG. 3B. In the particular example illustrated in FIG. 5, although alternative ML models may have been attempted, a determination has been made to initiate a retraining procedure to capture new location-specific training data and train a new ML model for the first sensor device 490. As a result, in some examples delivery and/or installation of a training device is automatically initiated.

Figure 6:
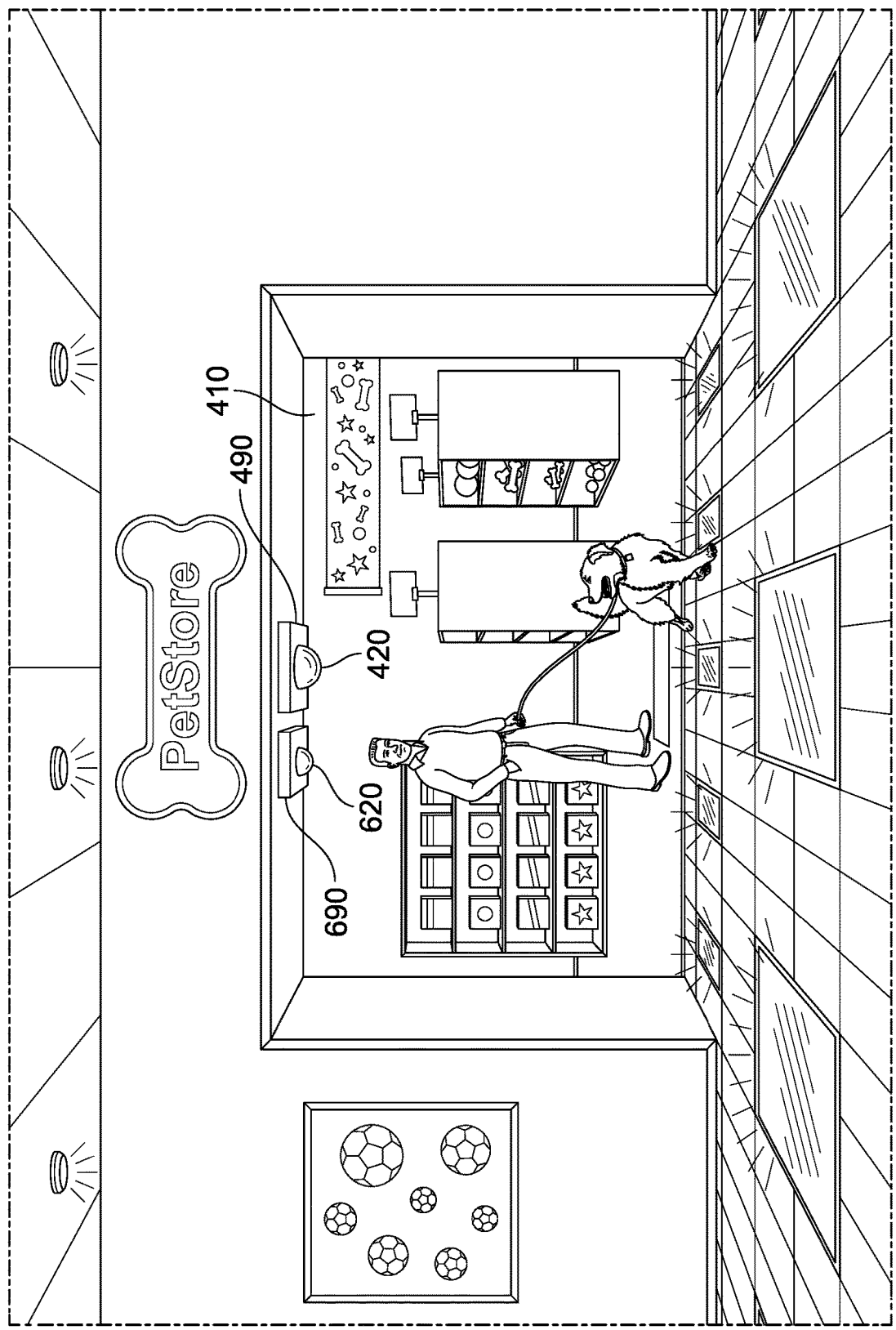
FIG. 6 depicts a continuation of the scenario presented in FIG. 5 in which a second physical sensor has been installed adjacent to the first physical sensor.

As one example, FIG. 6 depicts a continuation of the scenario presented in FIG. 5 in which a second physical sensor 620 has been installed adjacent to the first physical sensor 420, or otherwise arranged to measure events in the entryway, for a retraining procedure. In this example, the second physical sensor 620 is included in a training device 690, which may be configured and operated according to the description of the training device 312 in FIG. 3A. It may be understood that for purposes of this example, the first physical sensor 420 represents a low-cost physical sensor, while the second physical sensor 620 represents a high-cost physical sensor. In FIG. 6, each of the first physical sensor 420 and the second physical sensor 620 are configured to record, measure, or detect their respective physical phenomena approximately simultaneously for the entryway of the first retail space 410. Through this process, the first sensor device 490 automatically obtains third sensor data, which is of a first data type (in this example, RGB or IR image data), over a first period of time for a first physical location (the entryway of the first retail space 410) and the training device 690 automatically obtains second sensor data, which is of a second data type (in this case, depth image data), over the same first period of time for the same first physical location.

Much as described for FIGS. 3A and 3B and the training of the ML model initially applied by the sensor device 490, training event instance data is generated based on the second sensor data obtained by the second physical sensor 620. Based on the training event instance data and a corresponding portion of the third sensor data, location-specific training data is selectively generated, which in turn is used for training a location-specific ML model that should be more effective for the sensor device 490 in its changed environment. The sensor device 490 is automatically reconfigured to apply the new location-specific ML model in place of the previous ML model. Once this occurs and has been successfully tested (as described in FIGS. 3A and 3B), in some implementations, the first sensor device 490 can transmit a message to a remote system, and the training device 690 and/or the second sensor 620 can be removed, deactivated, disabled, or disengaged.

If automated testing indicates the model continues to show discrepancies or determines that a new, second performance metric is not within expected parameters, the process described with respect to FIG. 5 can be automatically repeated until the model is performing within expected parameters. With this capacity, the first device 390 is able to utilize a low-cost sensor with a first data type to provide the desired output with accuracy that typically corresponds to output based on data produced by high-cost sensors. In some situations, further retraining may be performed, as discussed in FIGS. 3A and 3B. In some implementations, the techniques described for FIG. 6 may be applied in connection with an initial installation of the sensor device 490, with the training device 690 temporarily installed to collect training data for training a location-specific ML model to be used initially for the sensor device 490 instead of a more generalized ML model, thereby optimizing the ML model initially used by the sensor device 490 at the location illustrated in FIG. 4.

Figure 7:
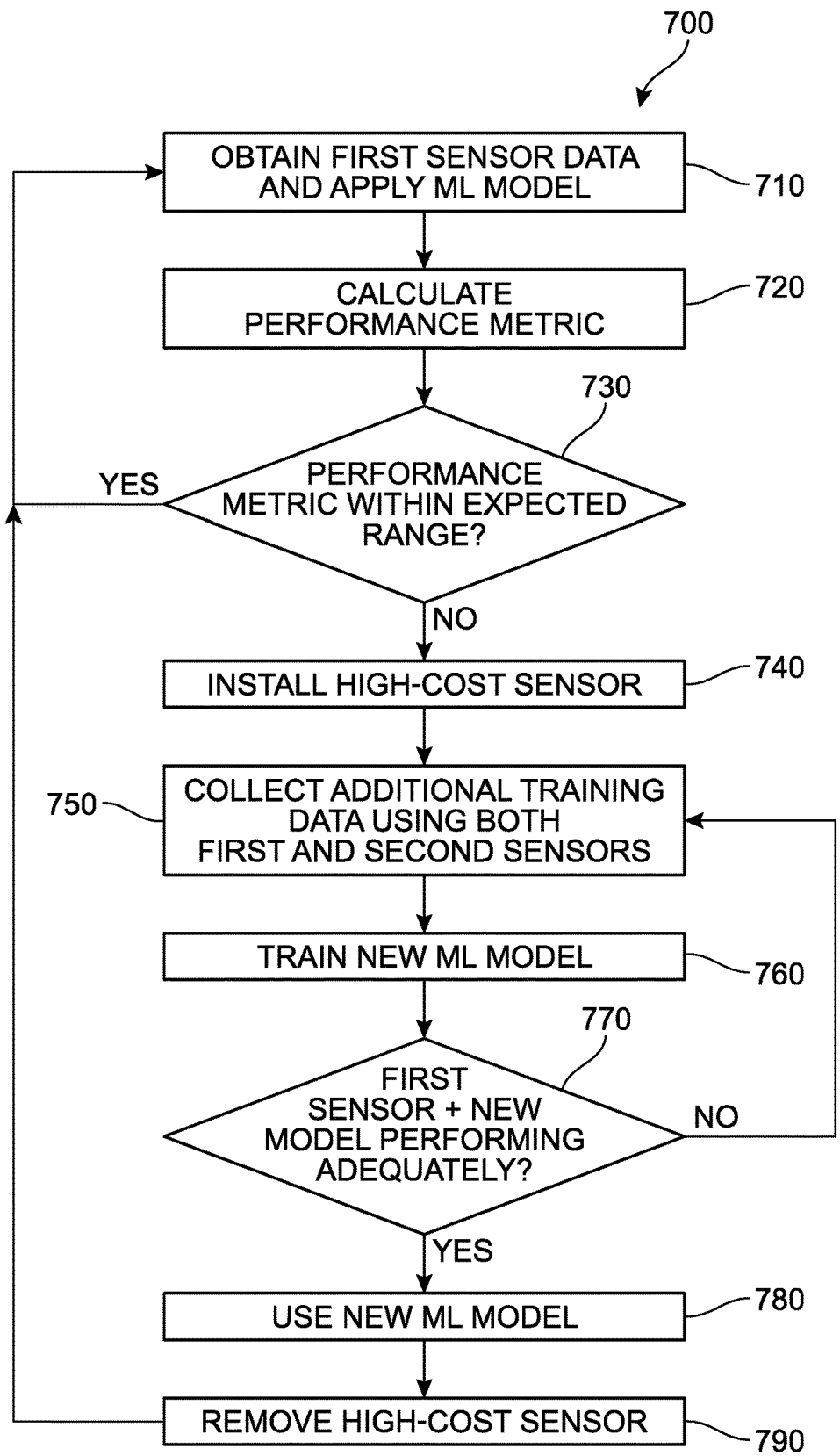
FIG. 7 is a flow chart presenting an example process for implementing self-assessment by a sensor, and automated retraining of the sensor device with a temporarily installed second high-cost physical sensor.

FIG. 7 illustrates an example process 700 for implementing self-assessment by a sensor device including a first low-cost physical sensor, such as the sensor device 490 illustrated in FIGS. 4-6, and automated retraining of the sensor device with a temporarily installed second high-cost physical sensor. At operation 710, the sensor device operates normally, obtaining first sensor data from the first low-cost physical sensor and applying a current ML model to identify event instances based on the first sensor data (without use of sensor data from a high-cost physical sensor used for training). At operation 720, the sensor device calculates a performance metric based on the application of the current ML model in operation 710. At operation 730, a determination is made whether the performance metric is within an expected range. In some examples, the operation 730 is performed periodically, and based on one or more performance metrics reflecting the effectiveness of the current ML model over one or more periods of time. If it is determined at 730 that the performance metric is within the expected range ("YES" at 730), the process 700 continues at operation 710.

If it is determined at 730 that the performance metric is not within the expected range ("NO" at 730), at operation 740 a retraining procedure begins in which a high-cost second physical sensor is installed, as described in FIGS. 3A, 3B, and 6. At operation 750, the sensor device collects additional localized training data using both the low-cost physical sensor and the high-cost physical sensor (which is used to generate training event instance data), as previously described. At operation 760, once the localized training data has been collected, a new ML model is trained, as described for previous examples. At operation 770, the sensor device enters a test mode, as described in previous examples, in which the sensor device is reconfigured to apply the new ML model, and a determination is made whether the newly trained ML model, as applied for sensor data from the low-cost first physical sensor to generate event instance data, is performing adequately. If it is determined at 770 that the new ML model is not performing adequately ("NO" at 770), the retraining procedure begins again at 750. If it is determined at 770 that the new ML model is performing adequately ("YES" at 770), at operation 780 the new ML model is left in use, at operation 790 the high-cost second physical sensor installed at 740 is removed, and the process returns to operation 710, in which events are identified using the low-cost first physical sensor without assistance from the high-cost second physical sensor.

Figure 8:
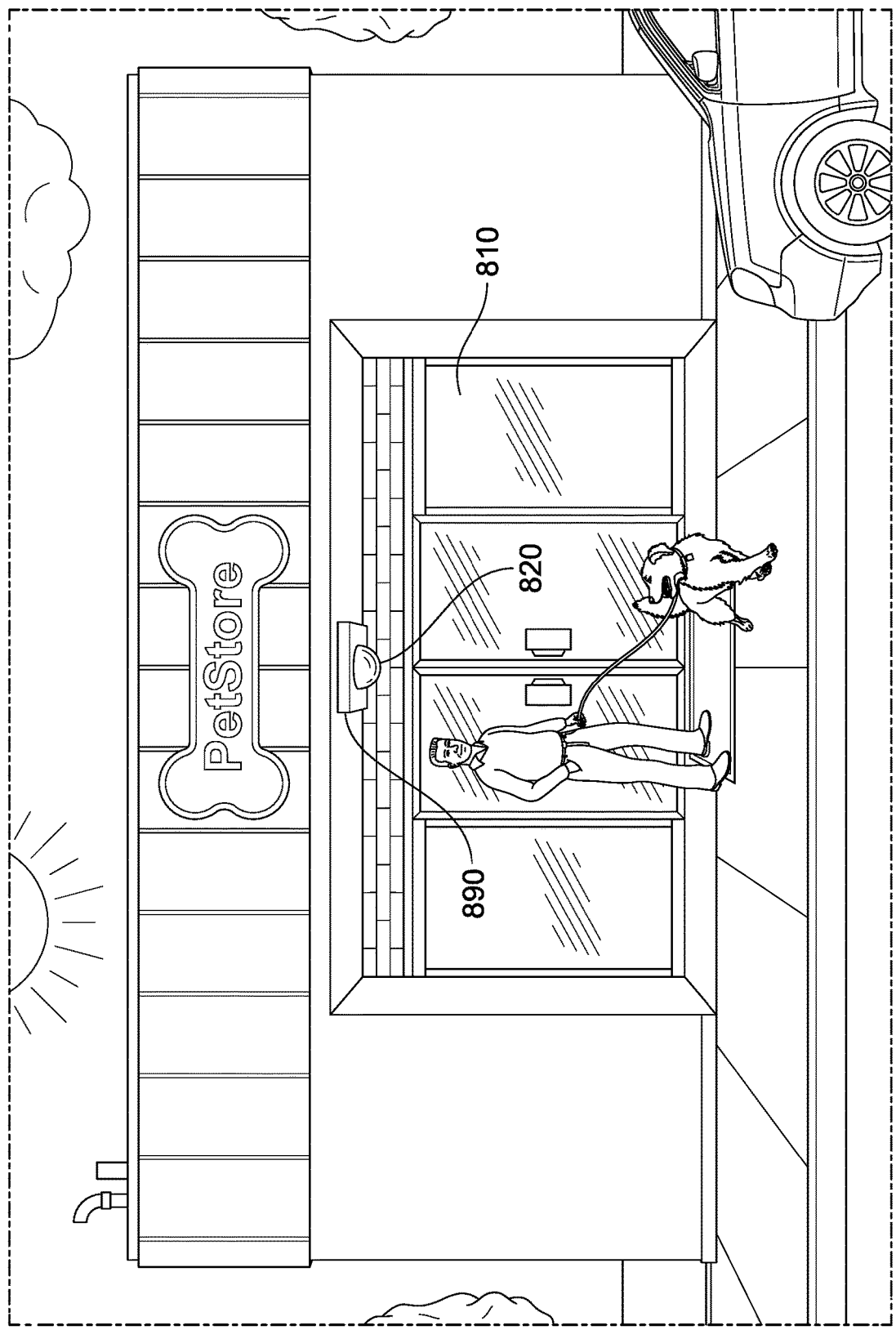
FIG. 8 illustrates an example of a sensor device in an outdoor retail space.

In different implementations, the devices and methods described herein may also be applicable to other situations in which an ML model is not fully effective and/or performing outside of expected parameters. This can occur directly after a sensor device is installed in some cases. For purposes of clarity, FIG. 8 illustrates another example of a sensor device. In FIG. 8, a section of an outdoor retail outlet or outdoor mall ("outdoor mall") is shown. The outdoor mall may include several retail spaces, including a second retail space 810, which is also pet store. A retailer has obtained a second sensor device ("second device") 890 that includes a low-cost third physical sensor ("third sensor") 820. The second sensor device 890 is configured essentially the same as the first sensor device 490 in FIG. 4, and is also used to detect and count people and dogs as described in FIG. 4.

In this example, following installation, the second sensor device 890 is switched on and begins to collect and process data. As described with respect to the first sensor device 490 in FIGS. 5 and 6 above, the second sensor device 890 is configured to automatically calculate a performance metric based on application of a current ML model to detect events based on sensor data obtained from the low-cost third physical sensor 820. Further, as with the first sensor device 490, the second sensor device 890 may be further configured to automatically determine that a performance metric is not within expected parameters, may be configured to respond to a determination that a performance metric is not within expected parameters as described for the first sensor device 490.

In contrast with the examples illustrated in FIGS. 4 and 5, in which the initial ML model applied by the first sensor device 490 was initially effective until a substantial change was made to its environment, in the example illustrated in FIG. 8, during an initial use of the second sensor device 890 (such as soon or substantially immediately after the second sensor device 890 begins operating at the illustrated location) the second sensor device 890 automatically determines that a performance metric is not within expected parameters. Thus, while a similar determination in FIG. 5 may have been made based a long-term history of performance metrics, in FIG. 8, at most a short-term history is available (which might still be useful) and other approaches, such as a predetermined threshold, may underlie a determination that the initial ML model for the second sensor device 890 is ineffective for the initial environment. A variety of factors may be involved in the ineffectiveness of the model, such as, but not limited to, training data used to generate the initial ML model not having been collected from a wide enough range of environments to generalize to the current environment, or the second sensor device 890 using a simple ML algorithm and/or model (for example, due to constrained computational resources) that is unable to generalize to a wide range of environments. In FIG. 8, a retraining procedure is performed using a temporarily installed training device, in essentially the same manner as described for the training device 690 in FIG. 6. As a result, a new location-specific ML model is produced for the second sensor device 890 that is effective for the environment shown in FIG. 8. Approaches similar to those described in FIGS. 6 and 8 can be used to allow customized ML models to be produced to address location specific factors and/or generate training data for a wider range of environments.

In different implementations, a sensor device may be obtained which includes more than one physical sensor. In other words, the methods described herein can include scenarios in which both a low-cost sensor and a high-cost sensor (and additional physical sensors in some implementations) are provided at the initial installation of a sensor device. For example, in FIG. 9, a scenario similar to FIG. 4 is illustrated, but with a third sensor device 990 that includes both a low-cost fifth physical sensor 920 and a high-cost sixth physical sensor 930. In this example, as with the examples in FIGS. 2, 4-6, and 8, the low-cost sensor 920 is an RGB or IR imaging sensor and the high-cost physical sensor 930 is a depth camera, although, as previously explained, other sensor types may be employed for either sensor. The third sensor device 990 applies a generalized initial ML model trained in essentially the same manner, to detect the same types of event instances from sensor data obtained from the low-cost fifth physical sensor 920, as the first sensor device 490. The third sensor device 910 has been installed in the same manner as the first sensor device 410 in FIG. 4, and configured to detect the same events. The third sensor device 990 may be configured to include the various features included in both the sensor device 310 and the training device 312 illustrated in FIG. 3A. In ordinary operation, the high-cost sixth physical sensor 930 is not used for detecting events by applying the initial ML model. In some examples, the high-cost sixth physical sensor 930 may be disengaged from the third sensor device 990, inactive, disabled, and/or unpowered during such ordinary operation of the third sensor device 990. However, in some implementations, an ML model applied by the third sensor device 990 can also or alternatively be trained to detect events based on sensor data obtained by the sixth physical sensor 930, separately or in combination with sensor data obtained by the fifth physical sensor 920.

As described with respect to the first sensor device 490 in FIGS. 5 and 6 and the second sensor device 890 in FIG. 8, the third sensor device 990 is configured to automatically calculate a performance metric based on application of a current ML model to detect events based on sensor data obtained from the low-cost fifth physical sensor 920. Further, as with the first sensor device 490, the second sensor device 890 may be further configured to automatically determine that a performance metric is not within expected parameters, may be configured to respond to a determination that a performance metric is not within expected parameters as described for the first sensor device 490 and the second sensor device 890.

In contrast with the examples illustrated in FIGS. 6 and 8, in which a separate training device including a high-cost physical sensor (for example, the training device 690 in FIG. 6) is temporarily installed to implement a retraining procedure, as the high-cost sixth physical sensor 930 is available at any time. Thus, in response to a determination that a performance metric is not within expected parameters, a retraining procedure similar to those described in FIGS. 3A, 3B, 6, and 8 may be performed using sensor data collected by the low-cost fifth physical sensor 920 during a same time period that sensor data is collected by the high-cost sixth physical sensor 930. As a result, a new location-specific ML model can be readily trained for the third sensor device 990 that is effective for the environment shown in FIG. 9. After a retraining procedure, the sixth physical sensor 930 may again be disengaged from the third sensor device 990, inactive, disabled, and/or unpowered during ordinary operation of the third sensor device 990. In some examples, a retraining procedure may be performed as part of an installation of the third sensor device 990, to begin operating with a location-specific, rather than a generalized, ML model.

Also, with the high-cost sixth physical sensor 930 available at hand, additional techniques are available for automatically confirming that a current ML model is operating effectively. In some implementations, the third sensor device 990 is configured to temporarily operate in an assessment mode, which operates much as described for the testing mode in FIGS. 3A and 3B. In the assessment mode, the sixth physical sensor 930 is temporarily operated together with the fifth physical sensor 920. Training event instance data is generated based on sensor data obtained from the sixth physical sensor 930, providing a "ground truth" which is compared against the event instance data generated by applying a current ML model to sensor data obtained from the fifth physical sensor 920. In some examples, where the event instance data for the fifth physical sensor 920 and the training event instance data for the sixth physical sensor 930 differ significantly, corresponding items of location-specific training data may be produced for use in training a new ML model, which, in some examples, may be retained for later training even if a current assessment does not trigger a retraining procedure. If the ML model is determined not to be effective based in this comparison, the third sensor device 990 may automatically initiate a retraining procedure. Otherwise, the third sensor device 990 returns to ordinary operation, in which the sixth physical sensor 930 may again be disengaged from the third sensor device 990, inactive, disabled, and/or unpowered during ordinary operation of the third sensor device 990.

The third sensor device 990 may be configured to periodically (for example, according to a schedule), or after a predetermined period of ordinary operation, automatically enter the above assessment mode. This allows the third sensor device 990 to perform a "preventative maintenance" of its ML model. The third sensor device 990 may be configured to enter the above assessment mode in response to an instruction received from another system, which may be configured to automatically issue the instruction periodically or after a predetermined period. In some implementations, the third sensor device 990 is not configured to perform the previously described performance metric calculation and evaluation, and instead rely on occasional assessment mode periods to identify circumstances where a current ML model is performing poorly. In some examples, the third sensor device 990 is configured to determine whether a performance metric is not within second expected parameters, which are more narrowly defined than first expected parameters for triggering a retraining procedure as discussed above, and switch into the above assessment mode in response to a determination that a performance metric is not within the second expected parameters. In some examples, the third sensor device 990 is configured to enter the above assessment mode upon, or shortly after, installation and initial operation of the third sensor device 990. This provides an immediate evaluation whether a generalized initial ML model is effective, and immediate retraining when the ML model is not effective. In some implementations, a similar assessment procedure can be performed with a sensor device that does not include a high-cost physical sensor (such as the first sensor device 490 or the second sensor device 890) according to a preplanned (including during an initial installation of the sensor device) and/or scheduled (for example, according to a periodic schedule) installation of a training device, such as the training device 690.

With the above capabilities, the third sensor device 990 can be customized in real-time to perform well regardless of physical location at which it is directly employed, and quickly and effectively respond to changes in its environment.

Figure 9:
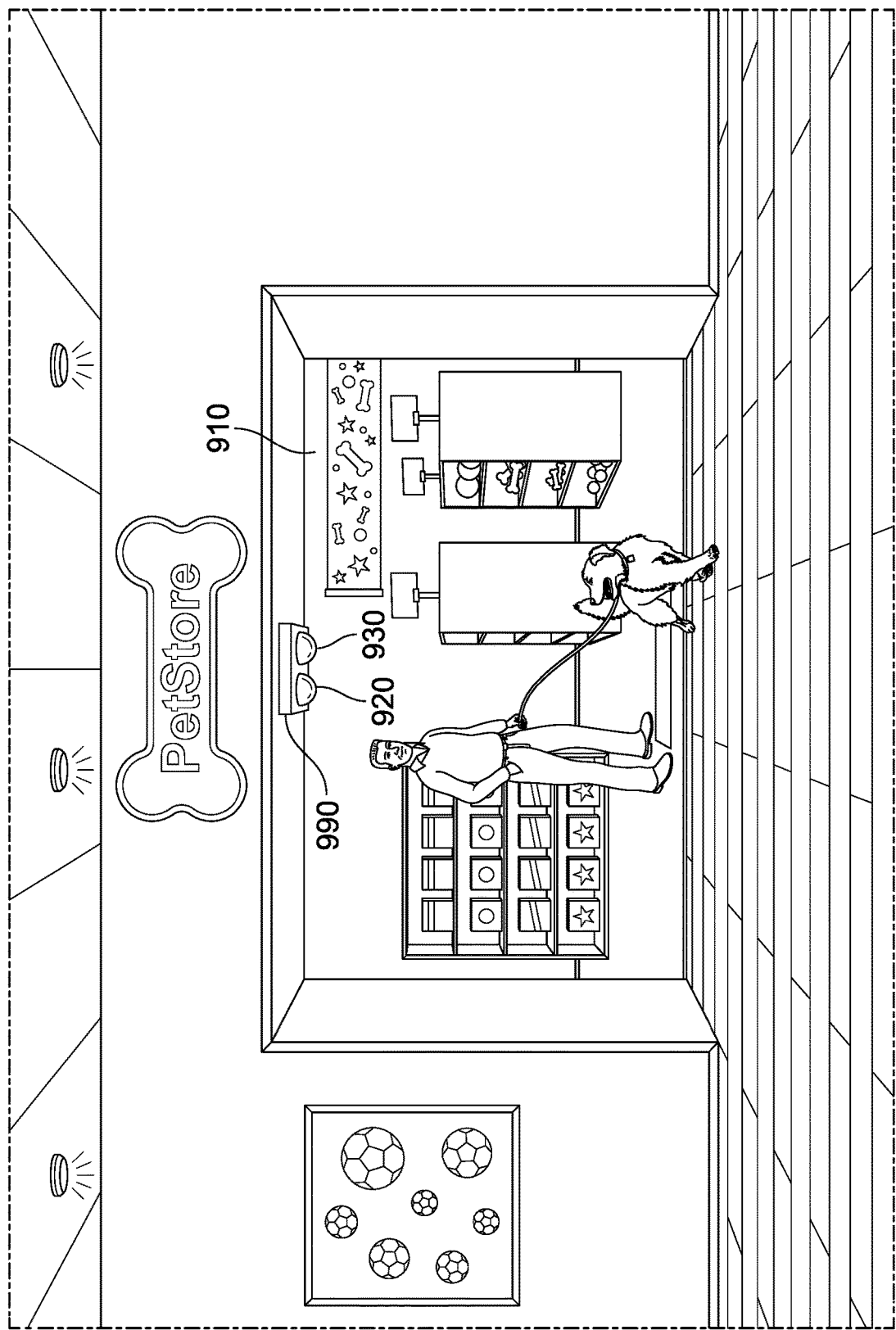
FIG. 9 is an example of an indoor retail outlet with a third sensor device that includes two physical sensors.
Figure 10:
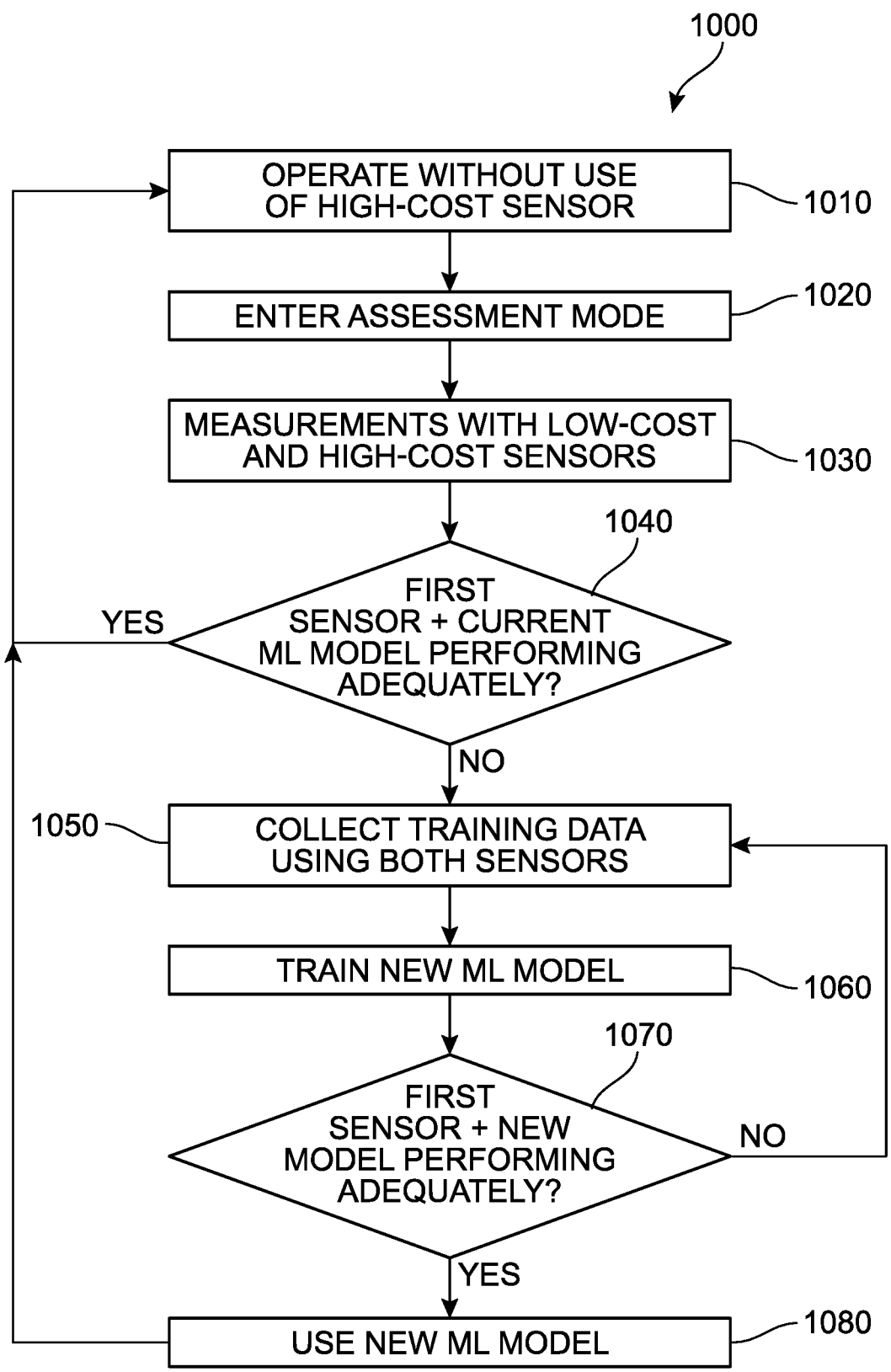
FIG. 10 is a flow chart presenting an example process for implementing an assessment mode feature for a sensor device.

FIG. 10 illustrates an example process 1000 for implementing an assessment mode feature for a sensor device that includes both a low-cost first sensor and a high-cost second physical sensor, such as the sensor device 990 illustrated in FIG. 9. Many aspects of the process 1000 are described in FIG. 9. In a first operation 1010, the sensor device is operated without use of the high-cost second physical sensor, much as described for ordinary operation of the sensor device 990. At an operation 1020, the sensor device enters an assessment mode, which may occur in response to various events, such as the examples described in FIG. 9. At an operation 1030, during a period of time, the sensor device performs measurements using both the low-cost first sensor and the high-cost second physical sensor. A first sensor data, obtained based on the measurements performed by the low-cost first sensor, is used to generate event instance data. A second sensor data, obtained based on the measurements performed by the high-cost second sensor, is used to generate training event instance data. The training event instance data serves as a "ground truth" against which the event instance data is compared. At operation 1040, a determination is made whether the current ML model, as applied for the first sensor data to generate the event instance data, is performing adequately. In some implementations, the operations 1030 and 1040 may be combined in part or in whole, with at least a partial determination of ML model performance made in real-time for each sample or set of samples being applied against the current ML model.

If it is determined at 1040 that the current ML model is performing adequately ("YES" at 1040), the assessment mode is concluded and the process 1000 returns to operation 1010 in which the sensor device is operated without use of the high-cost second physical sensor. If it is determined at 1040 that the current ML model is not performing adequately ("NO" at 1040), the process 1000 begins a retraining procedure in which at operation 1050 the sensor device collects localized training data using both sensors. At operation 1060, once the localized training data has been collected, a new ML model is trained, as described for previous examples. At operation 1070, the sensor device enters a test mode, as described in previous examples, in which the sensor device is reconfigured to apply the new ML model, and a determination is made whether the newly trained ML model, as applied for the first sensor data to generate event instance data, is performing adequately. If it is determined at 1070 that the new ML model is performing adequately ("YES" at 1070), the test mode is concluded, at operation 1080 the new ML model is left in use, and the process 1000 returns to operation 1010 in which the sensor device is operated without use of the high-cost second physical sensor. If it is determined at 1070 that the new ML model is not performing adequately ("NO" at 1070), the retraining procedure begins again at 1050.

The detailed examples of systems, devices, and techniques described in connection with FIGS. 1-10 are presented herein for illustration of the disclosure and its benefits. Such examples of use should not be construed to be limitations on the logical process embodiments of the disclosure, nor should variations of user interface methods from those described herein be considered outside the scope of the present disclosure. In some embodiments, various features described in FIGS. 1-10 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 11:
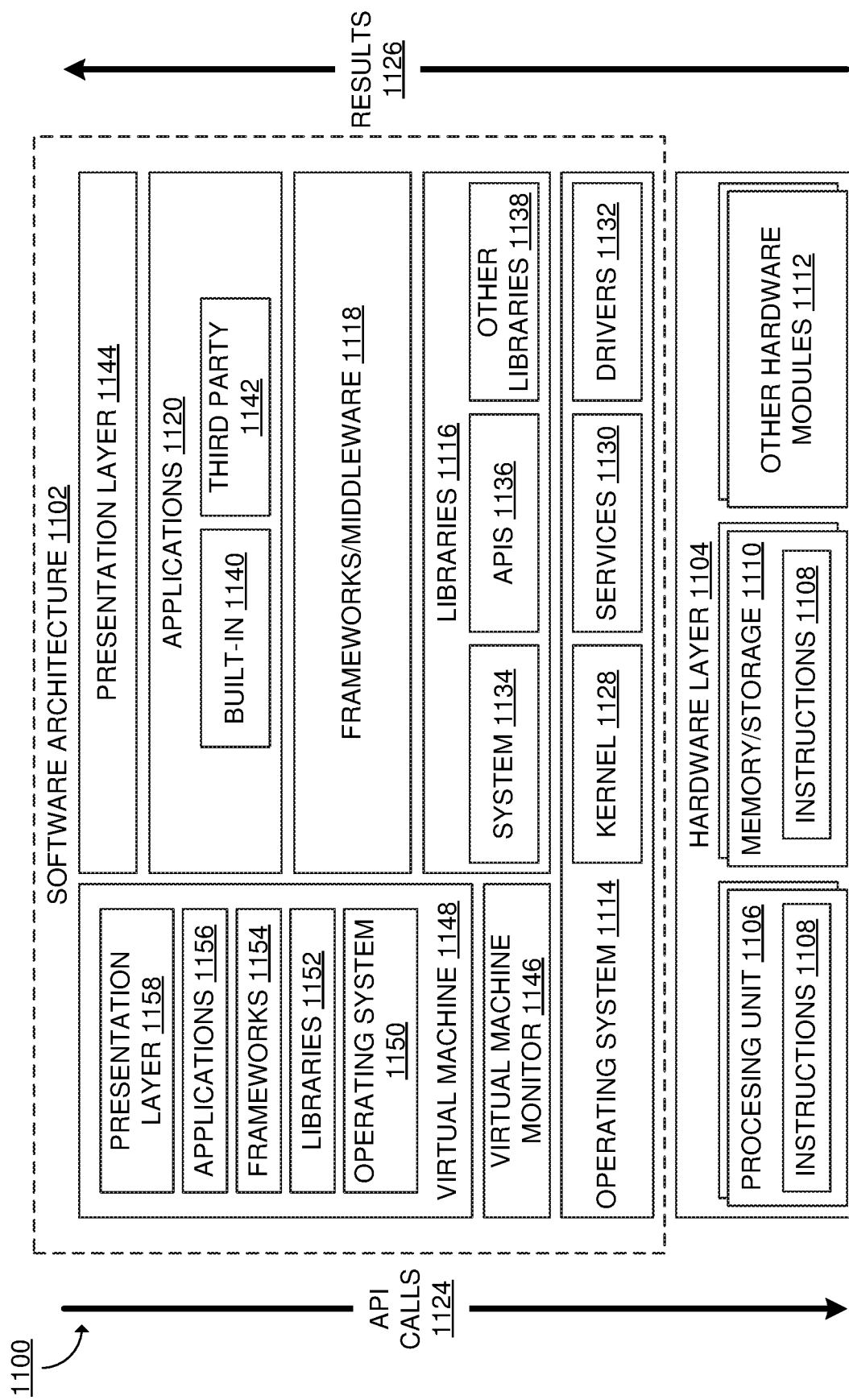
FIG. 11 is a block diagram illustrating an example software architecture, various portions of which may be used in conjunction with various hardware architectures, which may implement any of the described features.

FIG. 11 is a block diagram 1100 illustrating an example software architecture 1102, various portions of which may be used in conjunction with various hardware architectures herein described, which may implement any of the above-described features. FIG. 11 is a non-limiting example of a software architecture and it will be appreciated that many other architectures may be implemented to facilitate the functionality described herein. The software architecture 1102 may execute on hardware such as a machine 1200 of FIG. 12 that includes, among other things, processors 1210, memory 1230, and input/output (I/O) components 1250. A representative hardware layer 1104 is illustrated and can represent, for example, the machine 1200 of FIG. 12. The representative hardware layer 1104 includes a processing unit 1106 and associated executable instructions 1108. The executable instructions 1108 represent executable instructions of the software architecture 1102, including implementation of the methods, modules and so forth described herein. The hardware layer 1104 also includes a memory/storage 1110, which also includes the executable instructions 1108 and accompanying data. The hardware layer 1104 may also include other hardware modules 1112. Instructions 1108 held by processing unit 1108 may be portions of instructions 1108 held by the memory/storage 1110.

The example software architecture 1102 may be conceptualized as layers, each providing various functionality. For example, the software architecture 1102 may include layers and components such as an operating system (OS) 1114, libraries 1116, frameworks 1118, applications 1120, and a presentation layer 1144. Operationally, the applications 1120 and/or other components within the layers may invoke API calls 1124 to other layers and receive corresponding results 1126. The layers illustrated are representative in nature and other software architectures may include additional or different layers. For example, some mobile or special purpose operating systems may not provide the frameworks/middleware 1118.

The OS 1114 may manage hardware resources and provide common services. The OS 1114 may include, for example, a kernel 1128, services 1130, and drivers 1132. The kernel 1128 may act as an abstraction layer between the hardware layer 1104 and other software layers. For example, the kernel 1128 may be responsible for memory management, processor management (for example, scheduling), component management, networking, security settings, and so on. The services 1130 may provide other common services for the other software layers. The drivers 1132 may be responsible for controlling or interfacing with the underlying hardware layer 1104. For instance, the drivers 1132 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1116 may provide a common infrastructure that may be used by the applications 1120 and/or other components and/or layers. The libraries 1116 typically provide functionality for use by other software modules to perform tasks, rather than rather than interacting directly with the OS 1114. The libraries 1116 may include system libraries 1134 (for example, C standard library) that may provide functions such as memory allocation, string manipulation, file operations. In addition, the libraries 1116 may include API libraries 1136 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1116 may also include a wide variety of other libraries 1138 to provide many functions for applications 1120 and other software modules.

The frameworks 1118 (also sometimes referred to as middleware) provide a higher-level common infrastructure that may be used by the applications 1120 and/or other software modules. For example, the frameworks 1118 may provide various graphic user interface (GUI) functions, high-level resource management, or high-level location services. The frameworks 1118 may provide a broad spectrum of other APIs for applications 1120 and/or other software modules.

The applications 1120 include built-in applications 1140 and/or third-party applications 1142. Examples of built-in applications 1140 may include, but are not limited to, a contacts application, a browser application, a location application, a media application, a messaging application, and/or a game application. Third-party applications 1142 may include any applications developed by an entity other than the vendor of the particular platform. The applications 1120 may use functions available via OS 1114, libraries 1116, frameworks 1118, and presentation layer 1144 to create user interfaces to interact with users.

Some software architectures use virtual machines, as illustrated by a virtual machine 1148. The virtual machine 1148 provides an execution environment where applications/modules can execute as if they were executing on a hardware machine (such as the machine 1200 of FIG. 12, for example). The virtual machine 1148 may be hosted by a host OS (for example, OS 1114) or hypervisor, and may have a virtual machine monitor 1146 which manages operation of the virtual machine 1148 and interoperation with the host operating system. A software architecture, which may be different from software architecture 1102 outside of the virtual machine, executes within the virtual machine 1148 such as an OS 1150, libraries 1152, frameworks 1154, applications 1156, and/or a presentation layer 1158.

Figure 12:
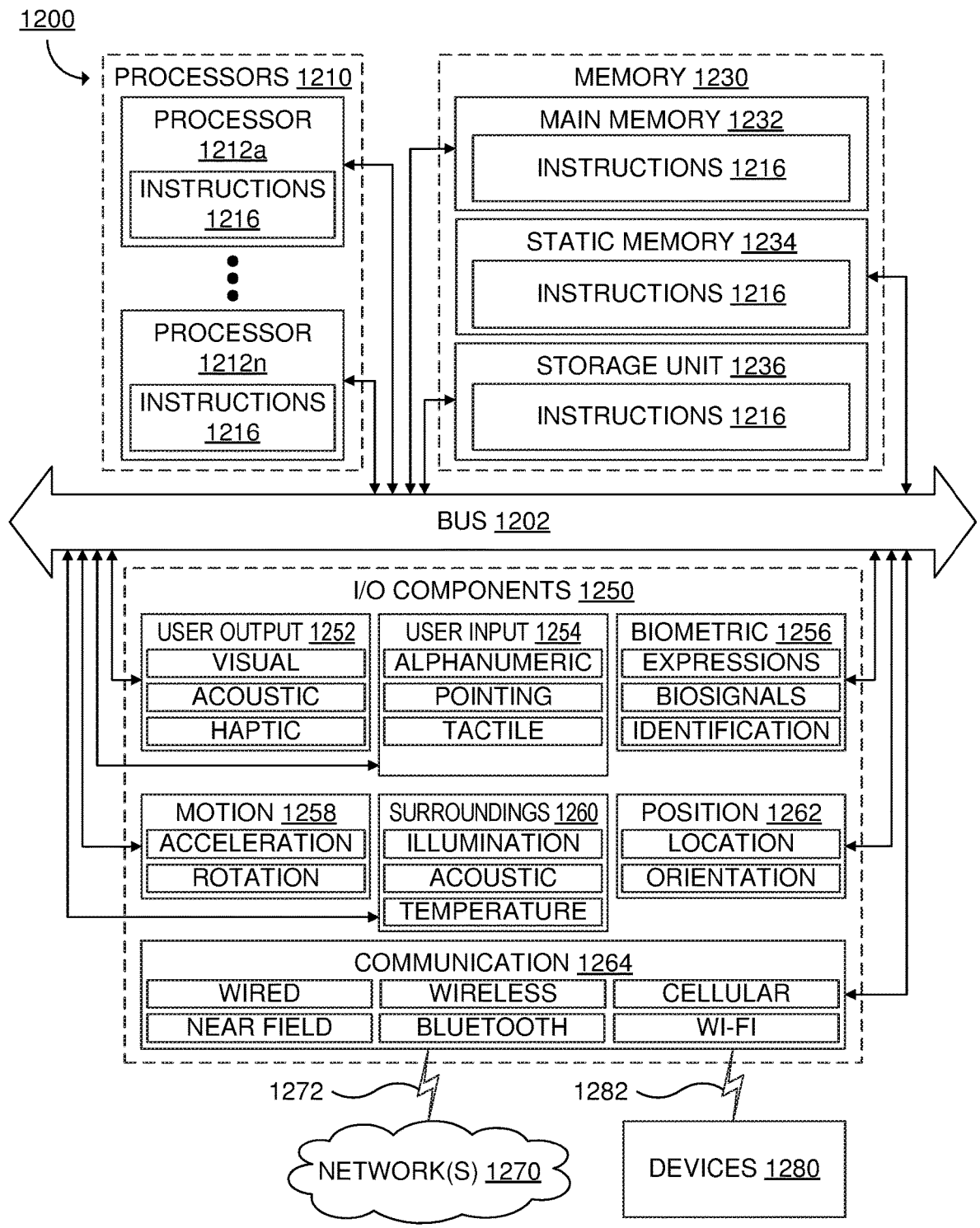
FIG. 12 is a block diagram illustrating components of an example machine configured to read instructions from a machine-readable medium and perform any of the described features.

FIG. 12 is a block diagram illustrating components of an example machine 1200 configured to read instructions from a machine-readable medium (for example, a machine-readable storage medium) and perform any of the features described herein. The example machine 1200 is in a form of a computer system, within which instructions 1216 (for example, in the form of software components) for causing the machine 1200 to perform any of the features described herein may be executed. As such, the instructions 1216 may be used to implement modules or components described herein. The instructions 1216 cause unprogrammed and/or unconfigured machine 1200 to operate as a particular machine configured to carry out the described features. The machine 1200 may be configured to operate as a standalone device or may be coupled (for example, networked) to other machines. In a networked deployment, the machine 1200 may operate in the capacity of a server machine or a client machine in a server-client network environment, or as a node in a peer-to-peer or distributed network environment. Machine 1200 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1200 is illustrated, the term "machine" include a collection of machines that individually or jointly execute the instructions 1216.

The machine 1200 may include processors 1210, memory 1230, and I/O components 1250, which may be communicatively coupled via, for example, a bus 1202. The bus 1202 may include multiple buses coupling various elements of machine 1200 via various bus technologies and protocols. In an example, the processors 1210 (including, for example, a central processing unit (CPU), a graphics processing unit (GPU), a digital signal processor (DSP), an ASIC, or a suitable combination thereof) may include one or more processors 1212a to 1212n that may execute the instructions 1216 and process data. In some examples, one or more processors 1210 may execute instructions provided or identified by one or more other processors 1210. The term "processor" includes a multi-core processor including cores that may execute instructions contemporaneously. Although FIG. 12 shows multiple processors, the machine 1200 may include a single processor with a single core, a single processor with multiple cores (for example, a multi-core processor), multiple processors each with a single core, multiple processors each with multiple cores, or any combination thereof. In some examples, the machine 1200 may include multiple processors distributed among multiple machines.

The memory/storage 1230 may include a main memory 1232, a static memory 1234, or other memory, and a storage unit 1236, both accessible to the processors 1210 such as via the bus 1202. The storage unit 1236 and memory 1232, 1234 store instructions 1216 embodying any one or more of the functions described herein. The memory/storage 1230 may also store temporary, intermediate, and/or long-term data for processors 1210. The instructions 1216 may also reside, completely or partially, within the memory 1232, 1234, within the storage unit 1236, within at least one of the processors 1210 (for example, within a command buffer or cache memory), within memory at least one of I/O components 1250, or any suitable combination thereof, during execution thereof. Accordingly, the memory 1232, 1234, the storage unit 1236, memory in processors 1210, and memory in I/O components 1250 are examples of machine-readable media.

As used herein, "machine-readable medium" refers to a device able to temporarily or permanently store instructions and data that cause machine 1200 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1216) for execution by a machine 1200 such that the instructions, when executed by one or more processors 1210 of the machine 1200, cause the machine 1200 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1250 may include a wide variety of hardware components adapted to receive input, provide output, produce output, transmit information, exchange information, capture measurements, and so on. The specific I/O components 1250 included in a particular machine will depend on the type and/or function of the machine. For example, mobile devices such as mobile phones may include a touch input device, whereas a headless server or IoT device may not include such a touch input device. The particular examples of I/O components illustrated in FIG. 12 are in no way limiting, and other types of components may be included in machine 1200. The grouping of I/O components 1250 are merely for simplifying this discussion, and the grouping is in no way limiting. In various examples, the I/O components 1250 may include user output components 1252 and user input components 1254. User output components 1252 may include, for example, display components for displaying information (for example, a liquid crystal display (LCD) or a projector), acoustic components (for example, speakers), haptic components (for example, a vibratory motor or force-feedback device), and/or other signal generators. User input components 1254 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1250 may include biometric components 1256, motion components 1258, environmental components 1260, and/or position components 1262, among a wide array of other physical sensor components. The biometric components 1256 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1258 may include, for example, acceleration sensors (for example, an accelerometer) and rotation sensors (for example, a gyroscope). The environmental components 1260 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1262 may include, for example, location sensors (for example, a Global Position System (GPS) receiver), altitude sensors (for example, an air pressure sensor from which altitude may be derived), and/or orientation sensors (for example, magnetometers).

The I/O components 1250 may include communication components 1264, implementing a wide variety of technologies operable to couple the machine 1200 to network(s) 1270 and/or device(s) 1280 via respective communicative couplings 1272 and 1282. The communication components 1264 may include one or more network interface components or other suitable devices to interface with the network(s) 1270. The communication components 1264 may include, for example, components adapted to provide wired communication, wireless communication, cellular communication, Near Field Communication (NFC), Bluetooth communication, Wi-Fi, and/or communication via other modalities. The device(s) 1280 may include other machines or various peripheral devices (for example, coupled via USB).

In some examples, the communication components 1264 may detect identifiers or include components adapted to detect identifiers. For example, the communication components 1264 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1262, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for generating a machine learning (ML) model to detect event instances from physical sensor data, the system comprising:
    a first physical sensor at a first location;
    a second physical sensor, wherein the second physical sensor is different than the first physical sensor;
    an ML event detection component at the first location and configured to apply a first ML model to detect event instances based on sensor data obtained from the first physical sensor; and
    a machine readable medium including instructions which, when executed by the system, cause the system to:
        receive, at the ML event detection component, first sensor data obtained from the first physical sensor,
        apply the first ML model, at the ML event detection component, to detect a first event based on at least the first sensor data and generate corresponding first event instance data,
        calculate a first performance metric for use of the first ML model in the first location, based on at least the application of the first ML model,
        automatically determine whether the first performance metric is within an expected parameter, and
        in response to a determination that the first performance metric is not within the expected parameter:
            obtain second sensor data from the second physical sensor at the first location during a first period of time,
            obtain third sensor data from the first physical sensor during the first period of time,
            generate first location-specific training data by selecting portions of the third sensor data based on first training event instances detected using the second sensor data,
            train a second ML model based on at least the first location-specific training data, and
            reconfigure the ML event detection component to apply the second ML model instead of the first ML model,
    wherein the expected parameter is determined based at least on a history of previously calculated performance metrics.

2. The system of claim 1, further comprising:
    a third physical sensor, wherein the third physical sensor is a same sensor type as the first physical sensor; and
    a fourth physical sensor, wherein the fourth physical sensor is different than the third physical sensor,
    wherein the instructions further cause the system to:
        obtain fourth sensor data from the third physical sensor at a second location during a second period of time,
        obtain fifth sensor data from the fourth physical sensor at the second location during the second period of time,
        generate second location-specific training data by selecting portions of the fourth sensor data based on second training event instances detected using the fifth sensor data; and
        train the first ML model based on at least the second location-specific training data.

3. The system of claim 1, further comprising a first device comprising a first hardware unit and a second hardware unit, wherein:
    the first physical sensor and the ML event detection component are included in the first hardware unit;
    the second physical sensor is included in the second hardware unit; and
    the second unit is different than the first unit.

4. The system of claim 1, wherein the instructions further cause the system to automatically issue a request for a temporary installation of the second hardware unit at the first location in response to the determination that the first performance metric is not within the expected parameter.

5. The system of claim 1, wherein:
    the first physical sensor and the second physical sensor are included in a same hardware unit; and
    the second physical sensor is inactive when the first sensor data is obtained from the first physical sensor.

6. The system of claim 1, wherein the instructions further cause the system to determine the expected parameter based on at least a history of previously calculated performance metrics for use of the first ML model in the first location.

7. The system of claim 1, wherein:
the first physical sensor and the second physical sensor are included in a same hardware unit;
the second physical sensor is configured to capture fourth sensor data during a first time interval, and become inactive during a second time interval; and
the second time interval is longer than the first time interval.

8. The system of claim 7, wherein the instructions further cause the system to:
generate training event instance data based on at least the fourth sensor data;
obtain fifth sensor data from the first physical sensor during the first time interval;
apply the second ML model to generate second event instance data based on at least the fifth sensor data;
compare the training event instance data with the second event instance data;
automatically determine the second ML model is not effective at the first location based at least on the comparison;
train a third ML model for the first location; and
reconfigure the ML component to apply the third ML model instead of the second ML model.

9. The system of claim 7, wherein the instructions further cause the system to:
generate training event instance data based on at least the fourth sensor data;
obtain fifth sensor data from the first physical sensor during the first time interval;
apply the second ML model to generate second event instance data based on at least the fifth sensor data;
compare the training event instance data with the second event instance data;
determine the second ML model is effective at the first location based at least on the comparison; and
disable the second physical sensor in response to at least the determination that the second ML model is effective.

10. A method for generating a machine learning (ML) model to detect event instances from physical sensor data, the method comprising:
operating, at a first location, a first device including a first physical sensor and an ML event detection component, wherein the ML event detection component is configured to apply a first ML model to detect event instances based on sensor data obtained from the first physical sensor;
receiving, at the ML event detection component, first sensor data obtained from the first physical sensor;
applying the first ML model, at the ML event detection component, to detect a first event based on at least the first sensor data and generate corresponding first event instance data;
calculating a first performance metric for use of the first ML model in the first location, based on at least the application of the first ML model;
automatically determining that the first performance metric is not within an expected parameter; and
in response to the determination that the first performance metric is not within the expected parameter:
obtaining second sensor data from a second physical sensor at the first location during a first period of time, wherein the second physical sensor is different than the first physical sensor,
obtaining third sensor data from the first physical sensor during the first period of time,
generating first location-specific training data by selecting portions of the third sensor data based on first training event instances detected using the second sensor data,
training a second ML model based on at least the first location-specific training data, and
reconfiguring the ML event detection component to apply the second ML model instead of the first ML model,
wherein the expected parameter is determined based at least on a history of previously calculated performance metrics.

11. The method of claim 10, further comprising:
obtaining fourth sensor data from a third physical sensor at a second location during a second period of time, wherein the third physical sensor is a same sensor type as the first physical sensor;
obtaining fifth sensor data from a fourth physical sensor at the second location during the second period of time, wherein the fourth physical sensor is different than the third physical sensor;
generating second location-specific training data by selecting portions of the fourth sensor data based on second training event instances detected using the fifth sensor data; and
training the first ML model based on at least the second location-specific training data.

12. The method of claim 10, wherein:
the first physical sensor and the ML event detection component are included in a first hardware unit included in the first device;
the second physical sensor is included in a second hardware unit included in the first device; and
the second unit is different than the first unit.

13. The method of claim 12, further comprising automatically issuing a request for a temporary installation of the second hardware unit at the first location in response to the determination that the first performance metric is not within the expected parameter.

14. The method of claim 10, wherein:
the second physical sensor is included in the first device; and
the second physical sensor is inactive when the first sensor data is obtained from the first physical sensor.

15. The method of claim 10, further comprising determining the expected parameter based on at least a history of previously calculated performance metrics for use of the first ML model in the first location.

16. The method of claim 10, wherein the determination that the first performance metric is not within the expected parameter occurs during an initial use of the first device at the first location.

17. The method of claim 10, wherein:
the second physical sensor is included in the first device;
the second physical sensor is configured to capture fourth sensor data during a first time interval, and become inactive during a second time interval; and
the second time interval is longer than the first time interval.

18. The method of claim 17, further comprising:
generating training event instance data based on at least the fourth sensor data;

obtaining fifth sensor data from the first physical sensor during the first time interval;

applying the second ML model to generate second event instance data based on at least the fifth sensor data;

comparing the training event instance data with the second event instance data;

automatically determining the second ML model is not effective at the first location based at least on the comparison;

training a third ML model for the first location; and reconfiguring the ML component to apply the third ML model instead of the second ML model.

19. The method of claim 17, further comprising:

generating training event instance data based on at least the fourth sensor data;

obtaining fifth sensor data from the first physical sensor during the first time interval;

applying the second ML model to generate second event instance data based on at least the fifth sensor data;

comparing the training event instance data with the second event instance data;

determining the second ML model is effective at the first location based at least on the comparison; and disabling the second physical sensor in response to at least the determination that the second ML model is effective.

20. A nontransitory machine readable medium including program instructions which, when executed by a machine, cause the machine to perform the method of claim 10.

* * * * *